(12) United States Patent
Sanchez-Valente et al.

(10) Patent No.: US 7,740,828 B2
(45) Date of Patent: Jun. 22, 2010

(54) PROCESS FOR PREPARING MULTIMETALLIC ANIONIC CLAYS AND PRODUCTS THEREOF

(75) Inventors: Jaime Sanchez-Valente, Mexico City (MX); Esteban Lopez-Salinas, Mexico City (MX); Manuel Sanchez-Cantu, Mexico City (MX)

(73) Assignee: Instituto Mexicano del Petroleo, Mexico, D.F. (MX)

( * ) Notice: Subject to any disclaimer, the term of this patent is extended or adjusted under 35 U.S.C. 154(b) by 0 days.

(21) Appl. No.: 12/631,327

(22) Filed: Dec. 4, 2009

(65) Prior Publication Data

US 2010/0081566 A1 Apr. 1, 2010

Related U.S. Application Data

(62) Division of application No. 11/926,656, filed on Oct. 29, 2007.

(30) Foreign Application Priority Data

Mar. 29, 2007 (MX) .................. MX/A/2007/003775

(51) Int. Cl.
C01B 13/14 (2006.01)
(52) U.S. Cl. ................... 423/592.1; 423/580.1
(58) Field of Classification Search ............. 423/592.1, 423/580.1
See application file for complete search history.

(56) References Cited

U.S. PATENT DOCUMENTS

| | | | |
|---|---|---|---|
| 4,656,156 A | 4/1984 | Misra | |
| 4,447,417 A | 5/1984 | Spickett et al. | |
| 4,458,026 A | 7/1984 | Reichle | |
| 4,476,324 A | 10/1984 | Reichle | |
| 4,539,195 A | 9/1985 | Schanz et al. | |
| 4,560,545 A | 12/1985 | Spickett et al. | |
| 4,883,533 A | 11/1989 | Kosin et al. | |
| 4,904,457 A | 2/1990 | Misra | |
| 4,970,191 A | 11/1990 | Schutz | |
| 5,055,620 A | 10/1991 | Schutz | |
| 5,202,496 A | 4/1993 | Schutz et al. | |
| 5,254,743 A | 10/1993 | Holmgren et al. | |
| 5,350,879 A | 9/1994 | Engel et al. | |
| 5,362,457 A | 11/1994 | Grubbs et al. | |
| 5,399,329 A | 3/1995 | Schutz et al. | |
| 5,514,361 A | 5/1996 | Martin et al. | |
| 5,645,810 A | 7/1997 | Easley | |
| 6,171,991 B1 | 1/2001 | Stamires et al. | |
| 6,376,405 B1 | 4/2002 | Stamires et al. | |
| 6,440,887 B1 | 8/2002 | Stamires et al. | |
| 6,440,888 B1 | 8/2002 | Stamires et al. | |
| 6,444,188 B1 | 9/2002 | Stamires et al. | |
| 6,541,409 B1 | 4/2003 | Jones et al. | |
| 6,593,265 B2 | 7/2003 | Stamires et al. | |
| 6,652,828 B2 | 11/2003 | Stamires et al. | |
| 6,710,004 B2 | 3/2004 | Stamires et al. | |
| 6,800,578 B2 | 10/2004 | Stamires et al. | |
| 6,815,389 B2 | 11/2004 | Stamires et al. | |
| 2003/0049189 A1 | 3/2003 | Stamires et al. | |
| 2008/0039314 A1 | 2/2008 | Jones et al. | |
| 2008/0293957 A1* | 11/2008 | Winters et al. | ............... 556/182 |

FOREIGN PATENT DOCUMENTS

| | | |
|---|---|---|
| GB | 1086779 | 10/1967 |
| GB | 1185920 | 3/1970 |

OTHER PUBLICATIONS

Mascolo et al., A new synthesis and characterization of magnesium-aluminium hydroxides, Mineralogical Magazine, Mar. 1980, vol. 43, pp. 619-621.
Miyata, Physico-chemical properties of synthetic hydrotalcites in relation to composition, Clays and Clay Minerals, vol. 28, No. 1, 50-56, 1980.
Feitnecht et al., Uber die Bildung von Doppelhydroxyden zwischen zwei- und dreiwertigen Metallen. Helv Chrn. Acta (1942), 25, 131 555-569.
Gerber et al., Zur Kenntnis der Doppelhydroxyde und basische Doppelsalze. III Uber Magnesium-Aluminiumdoppelhydroxyde, Helv Chim. Acta (1942) 25, 131-137.

* cited by examiner

*Primary Examiner*—Timothy C Vanoy
*Assistant Examiner*—Michelle Hou
(74) *Attorney, Agent, or Firm*—Roylance, Abrams, Berdo & Goodman, L.L.P.

(57) ABSTRACT

Multimetallic anionic clays (MACs) are prepared using economical raw materials or reactants and a procedure for obtaining a series of multimetallic mixed oxides derived from the thermal decomposition of the MACs which comprises: (1) dissolving water-soluble bimetallic and/or trimetallic sources in water, (2) dispersing and homogenizing separate water-insoluble divalent and/or trivalent metal precursors with a high-speed stirrer in order to obtain small and reactive particles; depending on the nature of the water-insoluble divalent and/or trivalent metal precursors, this process can be adjusted to a desired pH, (3) adding the suspension obtained in (2) to solution (1) with the reaction medium still dispersed to facilitate solid particle's reduction/dissociation, and (4) afterwards the slurry is aged for several hours and finally dried. This process enables raw materials or reactants to be easily handled, and eliminates unit operations involving product washing and/or purification steps.

27 Claims, 13 Drawing Sheets

PROCESS FOR PREPARING MULTIMETALLIC ANIONIC CLAYS AND PRODUCTS THEREOF

CROSS-REFERENCE TO RELATED APPLICATION

This application is a divisional application of Ser. No. 11/926,656, filed Oct. 29, 2007. This application claims the benefit of Mexican Patent Application No. MX/a/2007/003775, filed Mar. 29, 2007, the disclosure of which is hereby incorporated by reference in its entirety.

FIELD OF THE INVENTION

This invention pertains to the preparation of multimetallic anionic clays (MACs) and the product of such preparation. More particularly, this invention relates to a procedure for obtaining a series of multimetallic mixed oxides derived from the thermal decomposition of the anionic clays utilizing economical and readily available raw materials by means of a simple method.

BACKGROUND OF THE INVENTION

Anionic clays possess a crystalline structure consisting of positively charged layers constituting of specific combinations of metallic hydroxides amongst which anions and water molecules are found. These compounds can be represented by the following general formula:

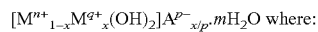

$[M^{n+}_{1-x}M^{q+}_x(OH)_2]A^{p-}_{x/p} \cdot mH_2O$ where:

$M^{n+}$ represents a metallic cation, $M^{q+}$ represents a metallic cation with upper positive charge (q>n), $A^{p-}$ represents any anion.

It has been found in nature that many minerals are isomorphs, characterized by having different stoichiometries, with more than one anion or more than two cations, or with small quantities of cations in the brucite-like interlaminar region. Such crystalline structures include pyroaurite, sjogrenite, hydrotalcite, stichtite, reevesite, eardleyite, manasseite, barbertonite, takovite, desautelsite, and hydrocalumite, among others. The chemical formulas of synthetic anionic clay forms include: $[Mg_6Fe_2(OH)_{16}]CO_3 \cdot 4H_2O$, $[Mg_6Al_2(OH)_{16}]CO_3 \cdot 4H_2O$, $[Mg_6Cr_2(OH)_{16}]CO_3 \cdot 4H_2O$, $[Ni_6Fe_2(OH)_{16}]CO_3 \cdot 4H_2O$, $[Ni_6Al_2(OH)_{16}]CO_3 \cdot 4H_2O$, $[Fe_6Fe_2(OH)_{12}]CO_3 \cdot mH_2O$, $[Ca_2Al(OH)_6][(OH)_{0.75}(CO_3)_{0.125} \cdot 2.5H_2O_6]OH \cdot 6H_2O$, $[Ca_2Al(OH)_6]OH \cdot 3H_2O$, $[Ca_2Al(OH)_6]OH \cdot 2H_2O$, $[Ca_2Al(OH)_6]OH$, $[Ca_2Al(OH)_6]Cl \cdot 2H_2O$, $[Ca_2Al(OH)_6]0.5CO_3 \cdot 2.5H_2O$, $[Ca_2Al(OH)_6]0.5SO_4 \cdot 3H_2O$, $[Ca_2Fe(OH)_6]0.5SO_4 \cdot 3H_2O$, $[(Ni,Zn)_6Al_2(OH)_{16}]CO_3 \cdot 4H_2O$, $[Mg_6(Ni,Fe)_2(OH)_{16}](OH)_2 \cdot 2H_2O$, $[Mg_6Al_2(OH)_{16}](OH)_2 \cdot 4H_2O$, $[(Mg_3Zn_3)Al_2(OH)_{16}]CO_3 \cdot 4H_2O$, $[Mg_6Al_2(OH)_{16}]SO_4 \cdot m H_2O$, $[Mg_6Al_2(OH)_{16}](NO_3)_2 \cdot mH_2O$, $[Zn_6Al_2(OH)_{16}]CO_3 \cdot mH_2O$, $[Cu_6Al_2(OH)_{16}]CO_3 \cdot mH_2O$, $[Cu_6Al_2(OH)_{16}]SO_4 \cdot mH_2O$, $[Mn_6Al_2(OH)_{16}]CO_3 \cdot mH_2O$.

In order to understand the structure of these compounds, it is necessary to take the structure of brucite $Mg(OH)_2$ as a reference, where $Mg^{2+}$ is found octahedrally coordinated to six hydroxyl groups, which, upon sharing their edges, form infinite layers. These layers pile up one on top of the other and are held together by hydrogen bridges. For example, when the $Mg^{2+}$ is replaced by $Al^{3+}$, the presence of the aluminum atoms produces positive charges in the structure which are compensated for with interlaminar anions together with water molecules. The most common anions are carbonates, but they can be $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^{-}$, $HGaO_3^{2-}$, $HVO_4^{2-}$, $ClO_4^{-}$, $ClO_3^{-}$, $ClO_4^{-}$, $IO_3^{-}$, $S_2O_3^{2-}$, $WO_4^{2-}$, $[Fe(CN)_6]^{3-}$, $[Fe(CN)_6]^{4-}$, $(PMo_{12}O_{40})^{3-}$, $(PW_{12}O_{40})^{3-}$, $V_{10}O_{26}^{6-}$, $Mo_7O_{24}^{6-}$, etc.

Specialists in this field will realize that the anionic clays are commonly referred to as, "Mixed metal hydroxides." This expression is derived from the fact that, as was noted earlier, the positively charged layers of the metallic hydroxides can contain two or more different metallic cations in different oxidation states, such as, $Mg^{2+}$, $Ni^{2+}$, $Zn^{2+}$, $Al^{3+}$, $Fe^{3+}$, $Cr^{3+}$, etc.

Additionally, and given that the X-ray diffraction patterns of many of the anionic clays are similar to the natural mineral known as hydrotalcite, $[Mg_6Al_2(OH)_{16}](CO_3) \cdot 4H_2O$, they are commonly called, "Hydrotalcite-like compounds." This term has been amply used in the scientific article and patent literature for many years. In fact, the terms, "Anionic clays," "Mixed metal hydroxides," "Hydrotalcite-like compounds," and "Double layered hydroxides," are closely related to each other and are used indistinctly. For the sake of simplicity, the term, "Hydrotalcite-like," is defined and used in a manner consistent with the literature, given that hydrotalcite, strictly speaking, has been the most studied anionic clay in the last decade.

It is known that anionic clays decompose in a predictable manner, and when they are heated without exceeding certain temperatures the materials resulting from the decomposition can be rehydrated, and optionally re-supplied with various anions different from the one that was originally found in the interlaminar region and from those that were removed during heating, thus reproducing the original anionic clay or a very similar one. The decomposition products of such heating are frequently referred to as "collapsed" or "meta-stable" anionic clays. However, if these collapsed or meta-stable materials are heated to temperatures above 800° C., the decomposition products of said anionic clays will not be able to be rehydrated and/or reconstituted to their original structure. Such anionic clay thermal decomposition process has been studied in detail in the academic and patent literature, for example, Miyata in "Physico-Chemical Properties of Synthetic Hydrotalcites in Relation to Composition", Clays and Clay Minerals, Vol. 28, 50-56 (1980).

One of the main problems to resolve when multimetallic anionic clays are prepared is proving that the cations really have incorporated themselves into the laminar structure. What's more, depending on the chemical nature of the cation, its velocity and precipitation pH may be different from that of the other cations. If the precipitation velocities amongst them are very different, a phase segregation will be obtained; that is, the cations will not be able to be incorporated in a uniform manner into the sheets of the anionic clay. For this reason, it is difficult to obtain multimetallic anionic clays whose crystallographic phases show themselves to be pure in an ample interval of cation compositions.

The preparation of synthetic anionic clays began with the pioneering works of Feitknecht and Gerber (1942) [Feitnecht, W., Über die Bildung von Doppelhydroxyden zwischen zwei- und dreiwertigen Metallen. Helv Chim. Acta (1942), 25, 555-569 and Gerber M., Zur Kenntnis der Doppelhydroxyde und basische Doppelsalze. III Über Magnesium-Aluminiumdoppelhydroxyde. Helv Chim. Acta (1942) 25, 131-137]. Their research group was the first to synthesize hydrotalcite via coprecipitation of a solution containing both the metallic cations, $MgCl_2$ and $AlCl_3$, with NaOH. Since then, similar syntheses have been described in the literature, all of them based on the precipitation of Mg and Al salts, followed by exhaustive washes to eliminate the remaining excess ions. Later on, new preparation methods were proposed, hydrothermal treatment among them, which was described by G. Mascolo and O. Marino, (1980) [Mascolo G., Marino O., A new synthesis and characterization of magnesium-aluminum hydroxides, Miner. Magazine 1980, 43, 619-621]. This consists in heating a magnesium oxide and alumina gel suspension in a closed container for 7 days. Nevertheless, the final product contained brucite phases, gibbsite, and in some cases boehmite, depending on the heating temperature and on the initial suspension's Mg/Al ratio.

Currently, a large number of patents exist regarding the preparation and use of anionic clays; those that stand out are described below:

In GB Patent No. 1,086,779 (1967) granted to Merck & Co. Inc., the preparation of magnesium aluminum hydroxycarbonates is described, where said hydroxycarbonates are prepared by the contact of a magnesium carbonate slurry, magnesium bicarbonate, or a mixture of these, with a soluble aluminum salt that can be aluminum sulfate, aluminum chloride, or aluminum nitrate, in the absence of sodium ions. The final sample is filtered and washed. It is proposed that these compounds be used as antacids.

With this same purpose for use, Kyowa Chemical Industry, in GB Patent No. 1,185,920 (1970), describes a process for the preparation of hydrotalcite, which encompasses the formation of a mixture at a pH of at least 8 from an aluminum component with a magnesium component, both of which are dissolved in an aqueous environment in the presence of carbonate ions in an $Al_2O_3$:MgO ratio of 1:6. The mixture may age between 0-150° C., and the carbonate to aluminum atom ratio should be at least 1/9. The final sample is filtered and washed.

In U.S. Pat. No. 4,447,417 (1984) and U.S. Pat. No. 4,560,545 (1985), by Robert G. W. Spickett, granted to Anphar S. A., the preparation of the bimetallic anionic clay (BAC): $Mg_6Al_2(OH)_{14}(CO_3)_2 4H_2O$ is described. The process for preparing this magnesium-aluminum basic carbonate encompasses heating a mixture of aluminum hydroxide and magnesium hydroxide in an aqueous environment that contains ammonia or a soluble nitrogenated organic base; whether it be a mono, di, or trialkylamine that contains more than 4 carbon atoms in the alkylamine radical(s), or pyridine or piperidine, the quantity of ammonia or of the organic base should be at least 6 moles per mole of $Al_2O_3$ present, at a temperature between 70-100° C. at atmospheric pressure. A carbon dioxide current is passed through the reaction mixture. The resulting mixture is put to reflux from 1 to 12 hours while the $CO_2$ stream passes through the mixture at a speed high enough to produce the AB.

Klaus Schanz, in U.S. Pat. No. 4,539,195 (1985), granted to Giulini Chemie GmbH, lays claim to the preparation of a crystalline aluminum-magnesium basic carbonate with the formula $Al_2Mg_6(OH)_{12}(CO_3)_3 xH_2O$ ($x \geq 4$) and its use as an antacid. The preparation process for this material includes mixing basic magnesium carbonate and at least one compound selected from the magnesium hydroxide and active magnesium oxide in an active aluminum hydroxide aqueous suspension where the magnesium oxide provided by the basic magnesium carbonate is found between 44-70% in weight of the total magnesium oxide, thus obtaining the aluminum-magnesium basic carbonate at temperatures of 50-100° C. as a final product.

Misra Chanakya, in U.S. Pat. No. 4,656,156 (1987), granted to Alcoa, describes the use of hydrotalcite as an anion adsorbent in which anywhere between 20-80% in weight may be the hydrotalcite, and between 80-20% in weight may be an activated alumina; said composition can be activated by heating between 500-600° C. The synthesis is carried out by the reaction of activated magnesia with an aqueous alkaline solution that contains aluminate, carbonate, and hydroxyl ions at a temperature between 80-100° C. The aqueous alkaline solution contains the aluminate, carbonate, and hydroxyl ions understood as NaOH, $Na_2CO_3$, and $Al_2O_3$.

John Kosin, in U.S. Pat. No. 4,883,533 (1989), granted to J.M Huber Corporation, describes the production of synthetic bimetallic anionic clays that contain phosphates, formula $xMgO.Al_2O_3.yPO_4.zH_2O$, which possess improved characteristics such as flame retardants. The procedure for preparing these synthetic BACs consists in an aqueous system that includes an Mg source, an Al source, and a carbonate source, which react with phosphoric acid to generate the final product. The magnesium sources can be: MgO, $Mg(OH)_2$, $MgCO_3$, and other water soluble Mg salts. The magnesium hydroxide is the preferred reagent in 40-60% of solids. The aluminum must be present in an adequate aluminum salt: the preferred reagents are sodium aluminate as an aqueous solution or solid trihydrated aluminum. Of the reagents that contain carbonates, the following are preferred: alkaline metal carbonates or bicarbonates, $CO_2$, alkaline metal earth bicarbonates, and mixtures of the aforementioned. Notwithstanding all of this, the preferred reagent is $Na_2CO_3$. These reagents are mixed in a closed reactor; the mix is heated at 150-200° C. for 1-3 hours, then filtered, washed, and dried.

Misra Chanakya, in U.S. Pat. No. 4,904,457 (1990), granted to Alcoa, describes a method for producing high yields of hydrotalcite that includes the activated magnesia reaction with an aqueous solution that contains aluminate, carbonate, and hydroxyl ions. The method includes a first step in which the carbonate or magnesium hydroxide is heated between 450-850° C. to form an activated magnesia or magnesium oxide. The method is appropriate for producing synthetic hydrotalcites from the Bayer liquid.

Alain A. Schutz, in U.S. Pat. No. 4,970,191 (1990), granted to Aristech Chemical Corporation, lays claim to a method for preparing a catalyst based on basic mixed oxides whose preparation consists of dispersing a pseudoboehmite in a water soluble acid (which may be acetic or nitric), and subsequently adding MgO o $Mg(OH)_2$ with an Mg/Al ratio in the gel of 1:1 up to 10:1. The mixture is stirred until the MgO disappears; the product is dried and calcined between 300-500° C. for 1-24 hours.

Donald Grubbs, in U.S. Pat. No. 5,362,457 (1994), granted to Alcoa, describes a method for producing an intercalated hydrotalcite without the need to form the hydrotalcite in the first place and then having to activate it later before substituting the anions in the hydrotalcite's structure. The invention includes reacting activated magnesia with an aqueous solution of aluminate, carbonate, and hydroxyl ions, as well as the anions that will form the BACs. It is preferable that the aluminate be a sodium aluminate and that the aqueous solution be free from carbonates. The anions that are selected should, preferably, belong to the bromide, chloride, sulfate, borate group, or combinations of these. Furthermore, this method provides a solid with high purity and a large yield.

Alain Schutz, in U.S. Pat. No. 5,399,329 (1995), granted to Aristech Chemical Corp., lays claim to the synthesis of a hydrotalcite-like material that has a "laminar" morphology and a width/thickness ratio of 50:1-5000:1. This material is represented by the following formula: $(Mg_{1-x}Al_x)(OH)_2 xA^- mH_2O$, where $A^-$ is a monocarboxylic anion in form $RCOO^-$, and R is $C_nH_{2n+1}$ with n=0-5; x is a number between 0.2 and 0.4; and m is a number between 0 and 4. In this process, a mixture of divalent metal cations, mainly made up of magnesium, and trivalent metal cations, mainly made up of aluminum, are reacted with monocarboxylic anions that have anywhere from 1-6 carbon atoms in a ratio of 1:1-10:1 in an aqueous slurry at 40° C. and at a pH of 7-12. The ratio of the monocarboxylic anion/trivalent metal cation is from (0.1-1.2):1. Thereafter, the slurry is dried obtaining a hydrotalcite-like material with laminar morphology and a width/thickness ratio of 50-5000. The Mg sources may be MgO or $Mg(OH)_2$. Another of this invention's innovations is that the Mg and the Al can be substituted up to 50% in mole for divalent cations selected from the Ni, Cu, Zn, Co, and Mn group, and for trivalent cations selected from the Fe and Cr group, respectively.

Martin Edward, in U.S. Pat. No. 5,514,361 (1996), granted to Alcoa, presents a method for preparing a synthetic meixnerite obtained by the combination of magnesium oxide and alumina powder, preferably an alumina with a specific area$\geq$100 $m^2/g$ in a carbonate-free environment. The MgO and the alumina are combined in water, heating the mixture between 50-180° C. The solid is separated producing a meixnerite compound. One of the key stages during the synthesis process is to maintain the solution in an inert atmosphere in order to avoid the incorporation of other anions such as carbonates and nitrates, mainly.

The meixnerite synthesis is also claimed in U.S. Pat. No. 5,645,810 (1997), granted to Alcoa. The method consists of calcining a hydrotalcite between 500-900° C., cooling it, and hydrating it in a $CO_2$ free atmosphere. When the meixnerite is produced this way, it generates a solid with a specific area$\geq$290 $m^2/g$.

In a series of patents: U.S. Pat. No. 6,171,991 (2001), U.S. Pat. No. 6,376,405 (2002), U.S. Pat. No. 6,440,887 (2002), U.S. Pat. No. 6,440,888 (2002), U.S. Pat. No. 6,444,188 (2002), U.S. Pat. No. 2003/0049189, U.S. Pat. No. 6,652,828 (2003), U.S. Pat. No. 6,593,265 (2004), U.S. Pat. No. 6,710,004 (2004), U.S. Pat. No. 6,800,578 (2004), and U.S. Pat. No. 6,815,389 (2004) granted to Akzo Nobel N.V., Dennis Stamires and collaborators describe a process for producing anionic clays using economical raw materials by means of a synthesis process adequate for being carried out in a continuous manner. The authors indicate that, due to the nature of the precursors, there is no need to carry out washes or to filter. Likewise, according to the authors, it is possible to obtain an ample variety of $M^{2+}/M^{3+}$ ratios through the procedure described in these patents. The processes consist mainly of: a) Putting a magnesium source (generally MgO, $Mg(OH)_2$, $MgCO_3$ or their mixtures) in contact with an aluminum source (trihydrated aluminum, gibbsite, bayerite, norstrandite, boehmite, $Al(NO_3)_3 \cdot 9H_2O$ or their mixtures in an aqueous medium; b) submitting them to a treatment at room pressure and temperature or at elevated pressure and temperatures; c) adjusting the pH with an acid or base and aging the mixture at temperatures between 85-240° C. from 5 minutes to 5 days. In the same manner, the authors indicate that during the process of preparing the anionic clays an anionic exchange can take place with pillared anions, mainly with $V_{10}O_{28}^{6-}$, $Mo_7O_{24}^{6}$, tungstates, phosphates, borates, vanadates, and/or their mixtures.

In U.S. Pat. No. 6,440,888 (2002), Stamires describes a process for preparing bimetallic anionic clays (BACs) where the divalent cation can by anything except magnesium. The examples encompass the preparation of BACs: ZnAl, CuAl, and FeAl with molar ratios of $M^{2+}/M^{3+}$~2. The reaction times vary from 1-18 h, with temperatures between 50-250° C. The aluminum sources are calcined alumina and gibbsite.

Simultaneously, in U.S. Pat. No. 6,444,188 (2002), U.S. Pat. No. 2003/0049189, and U.S. Pat. No. 6,652,828, Stamires lays claim to the process for obtaining bimetallic anionic clays where the trivalent cation is anything but aluminum. The examples include the preparation of BACs: MgGa, MgCr, and MgFe through the contact of MgO with gallium oxide, gallium nitrate, chromium nitrate, or ferric nitrate maintaining an $M^{2+}/M^{3+}$=2.3 ratio. The slurry is adjusted to pH=10 with $NH_3OH$. The mixture can be treated from 50-250° C. for 1-18 hours.

William Jones, in U.S. Pat. No. 6,541,409 (2003), granted to Akzo Novel NV, claims an anionic clay production process using a boehmite without peptization. The process involves the reaction of slurry that contains a boehmite without peptization and a magnesium source. In addition, according to the invention there is no need to wash the product.

The anionic clay preparation is carried out through the contact of MgO with the following aluminas: Catapal or Versal V-250 or Condea P200, continuing to stir the slurry for 4-48 hours at 0-185° C.

In the last decades, anionic clays have found multiple applications in fields such as: medicine, support or catalyst for different organic reactions, adsorbents to eliminate or reduce the sulfur oxides (SOx) and/or nitrogen (NOx) in gas streams, flame retardant, etc.

Standing out amongst the applications as a catalyst are W. T. Reichle's pioneering works, protected by U.S. Pat. No. 4,458,026 (1984) and U.S. Pat. No. 4,476,324 (1984) assigned to Union Carbide Co., in which the use of mixed oxide obtained from the calcination of the binary anionic clay MgAl in the conversion of the acetone into mesityl oxide and isophorone, as well as the aldol condensation of other compounds containing carbonyl groups, is described.

In this same sense, the patents by A. A. Schutz, U.S. Pat. No. 5,055,620 (1991) and U.S. Pat. No. 5,202,496 (1993) granted to Aristech Chemical Co., protect the preparation and use of basic mixed oxides with Mg/Al: 1 to 10 ratios, as effective catalysts in the condensation of acetone into isophorone, and other reactions catalyzed by bases such as olefin isomerization and the aldol condensation of aldehydes.

Holmgrem et al., in U.S. Pat. No. 5,254,743 (1993) assigned to UOP, describes the use of solid bases resulting from the calcination of laminar double hydroxides as effective catalysts in aldol condensations of aldehyde and ketone, in particular from the conversion in liquid phase of the n-butyraldehyde into 2-ethyl-2-hexenal with a high yield and good selectivity.

Engel et al, in U.S. Pat. No. 5,350,879 (1994) assigned to UOP, proposes the use of solid solutions resulting from MgAl anionic clay calcination resultants as a basic catalyst in the transesterification of alkyl acetates and their respective alcohols, with an excellent yield and high selectivity.

Given the importance of the heterogeneous basic catalysts in fine chemistry, the easy control of their physicochemical properties, which depend on the metallic cations incorporated into the network, their amount, and the nature of the interlaminar anions, obtaining multimetallic anionic clays through a simple and economically viable method is of great importance. The scientific and patent references repeatedly include the use of acid and/or basic substances, organic or inorganic, in order to adjust the pH of the solutions, which includes NaOH, $NaHCO_3$, $Na_2CO_3$, KOH, $K_2CO_3$, $NH_4OH$, $(NH_4)_2CO_3$, or any alkaline compound. Nevertheless, the use of alkaline metal hydroxides or carbonates requires that the final solid be submitted to a series of exhaustive washes with the goal of eliminating these ions.

SUMMARY OF THE INVENTION

It has been found that use of one, two or more water-soluble divalent and/or trivalent metal precursors, such as a nitrated metallic source and one, two or more water-insoluble divalent or trivalent metal precursors, such as metallic oxides in order to reach the multimetallic hydrotalcite formation pHs, permits easy elimination and/or incorporation during the heating and/or activation processes, avoiding, in this manner, the problems associated with the use of alkaline metal hydroxides or carbonates (KOH, NaOH, $K_2CO_3$, $Na_2CO_3$, etc.). Within the confines of this invention, control over time and stirring speed for obtaining the MACs is included. It is possible to modulate the crystallinity of the MACs through control over the stirring speed.

Thus, a new procedure has been found to prepare multimetallic mixed oxides derived from the thermal decomposition of multimetallic anionic clays (MACs) in order to reach the multimetallic hydrotalcite formation pHs, using a combination of metal precursors that are easily eliminated and/or incorporated during the heating and/or activation processes, avoiding, in this manner, the problems associated with the use of alkaline metal hydroxides or carbonates (KOH, NaOH, $K_2CO_3$, $Na_2CO_3$, etc.). Within the confines of this invention, control over time and stirring speed for obtaining the MACs is included. It is possible to modulate the crystallinity of the MACs through control over the stirring speed.

Another embodiment of the present invention is obtaining multimetallic anionic clays as intermediate products of the procedure of this invention, with a uniform distribution of the metal cations in the layers of the same.

A further embodiment of the present invention involves a rehydration procedure of the multimetallic mixed oxides to obtain the original MAC.

The MACs prepared according to the invention are represented by the following formula:

$$[M(II)_{1-x}M(III)_x(OH)_2](A^{n-}{}_{x/n}).mH_2O,$$

where [M(II)]/[(M(III)], is the molar ratio between the divalent cations and the trivalent cations and is found between 0.5-10; M(II) represents one or a combination of two or more elements from group 2, 6-12 and 14 of the periodic table with valence equal to two; M(III) represents a combination of two or more elements from group 4-9, 13, Ce, and La, with valence equal to 3 and different from M(II).

A represents any anion located between the layers composed of the aforementioned cations.

n– represents the interlaminar anion's negative electronic charge and may be from –1 to –8.

m represents the water molecules present as hydration water or as water present in the interlaminar region and can be from 0-2.

x=0.09 to 0.67 and are prepared by a process comprising:
a) dissolving one, two, or more water-soluble divalent and/or trivalent metal precursors in water, maintaining control over the water/solid weight ratio,
b) admixing one, two, or more water-insoluble divalent and/or trivalent metal precursors in powder form or in water suspension form, or a combination of both, with solution (a) to form a reaction mixture and disperse insoluble particles of said water-insoluble precursor in said reaction mixture,
c) aging the reaction mixture slurry at temperatures between 0-100° C., from 0.1 hour to 10 days, at atmospheric pressure or in an autoclave at temperatures between 100-300° C., at pressures greater than atmospheric pressure from 0.1 hour to 10 days, said slurry having a pH in the range of 6 to 12,
d) drying the resultant slurry at a temperature between 60 and 250° C., with air, nitrogen, or a vacuum, or any combination thereof.

More specifically, the process involves:
a) dissolving one, two, or more water-soluble divalent and/or trivalent metal precursors in water, maintaining control over the water/solid weight ratio,
b) adding one, two, or more water-insoluble divalent and/or trivalent metal precursors in powder form or in water suspension form, or a combination of both, and homogenizing with a high-speed stirrer between 4000 and 10000 rpm, at temperatures between 0-100° C. from 0.1 to 12 hours,
c) mixing solution (a) and suspension (b) to form anionic clays at a pH between 6 and 12,
d) adding, in the cases that require adjusting the pH of the reaction mixture to obtain a pure MAC structure, the following:
   i) 0.1-10 molar acid solution of $HNO_3$, HCl, acetic acid, formic acid, or any inorganic or organic acid that does not require washes in order to eliminate undesirable ions, or any combination of them, or
   ii) 0.1-10 molar alkaline solution of $(NH_4)_2CO_3$, $NH_4OH$, ammonium phosphate, urea, any alkaline compound that does not requires washes in order to eliminate undesirable ions, or any combination thereof.
e) dispersing the particles and, optionally, homogenizing the dispersed particles of the slurry's non-soluble components from step (c), whether it is before being added to the aqueous suspension or when they are already part of it,
f) aging the reaction mixture at temperatures between 0-100° C., from 0.1 hour to 10 days at atmospheric pressure or in an autoclave at temperatures between 100-300° C. at pressures above atmospheric pressure from 0.1 hour to 10 days,
g) drying the slurry at a temperature between 60 and 250° C., with air, nitrogen, or a vacuum, or any combination thereof.

Since the MAC production process does not require washing or filtering the final product, as occurs with the anionic clays prepared by coprecipitation, the production of filtered waste is eliminated. Furthermore, this allows compliance with the growing environmental regulations imposed upon industrial production processes.

In addition, the subsequent treatments to be carried out on the MACs depend on the application of said MACs, for example, in the event that these are used after a thermal treatment that collapses their structure and generates a mixed oxide. In accordance with this invention there is no need to wash the product, thus eliminating the purification problems and costs associated with the conventional preparation of these materials. The process includes the reaction, in an aqueous environment, of divalent and trivalent metal sources, as well as of the interlaminar anions that may be incorporated.

According to the invention, the precursors are supplied by divalent cations, for example: $Mg(NO_3)_2.6H_2O$, MgO, $Mg(OH)_2$, $Zn(NO_3)_2.6H_2O$, ZnO, $Zn(OH)_2$, $Ni(NO_3)_2.6H_2O$, NiO, $Ni(OH)_2$, $Cu(NO_3)_2.6H_2O$, $Cu(NO_3)_2.2½H_2O$, CuO, $Cu(OH)_2$, etc., and from trivalent cations: boehmite, bayerite, gibbsite, $Al(NO_3)_3.9H_2O$, $Fe_2O_3$, $Fe(NO_3)_3.9H_2O$, chromates, etc., which are fed to a reactor where reaction conditions are adjusted in order to obtain an anionic clay. The reaction can be carried out under different conditions, resulting in the formation of a laminar compound that can be obtained directly drying the slurry.

The MACs prepared according to the invention have the X-ray diffraction pattern characteristic of the laminar anionic clays; in addition, the physical and chemical properties are comparable to those of anionic clays prepared by other methods reported in the literature. The present process is very flexible since it enables a great variety of MACs, with different types of interlaminar anions, to be obtained in an economical, simple, and environmentally friendly manner.

Thus, the invention pertains to the preparation of multimetallic anionic clays (MACs) and a procedure for obtaining a series of multimetallic mixed oxides derived from the thermal decomposition of the anionic clays prepared according to the invention. These anionic clays' collapsed structure produces a solid solution consisting in a homogeneous mixture of the metallic oxides. The precursor laminar structure is completely regenerable as long as the pre-treatment temperature of 800° C. is not surpassed, avoiding the formation of the spinel phase, and thus conserving the so-called "memory effect", characteristic of this type of material.

BRIEF DESCRIPTION OF THE DRAWINGS

In order to show the raw materials structure and the multimetallic anionic clays features, reference is made to the figures herein included.

The X-ray diffraction pattern of (A) corresponds to an aliquot taken after the MgO+HiQ-30 was added to the Fe nitrate solution; the aliquot was filtered to eliminate the greatest quantity of water possible and was analyzed by XRD.

The X-ray diffraction pattern of (B) corresponds to an aliquot taken after the dispersion of the MgO+HiQ-30 slurry in the Fe nitrate solution for 4.5 hours; the aliquot was filtered and analyzed by XRD.

The X-ray diffraction pattern of (C) corresponds to an aliquot taken after aging at 80° C. for 15 hours at 250 rpm. The aliquot was filtered and analyzed by XRD.

The X-ray diffraction pattern of (D) corresponds to the sample that was spray dried.

Figure 19:
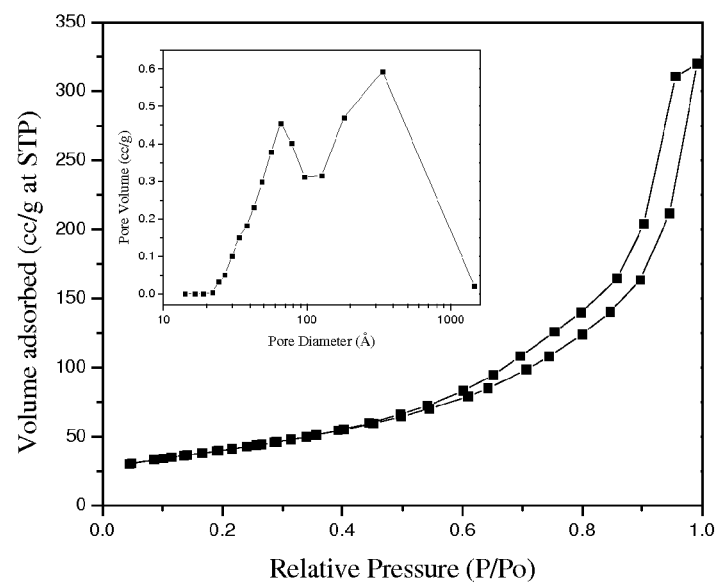

FIG. 19 Textural analysis of the MgFeAl sample prepared according to Example 6. The analysis corresponds to the sample dried at 120° C. and subsequently calcined at 500° C./4 hours.

Figure 20:
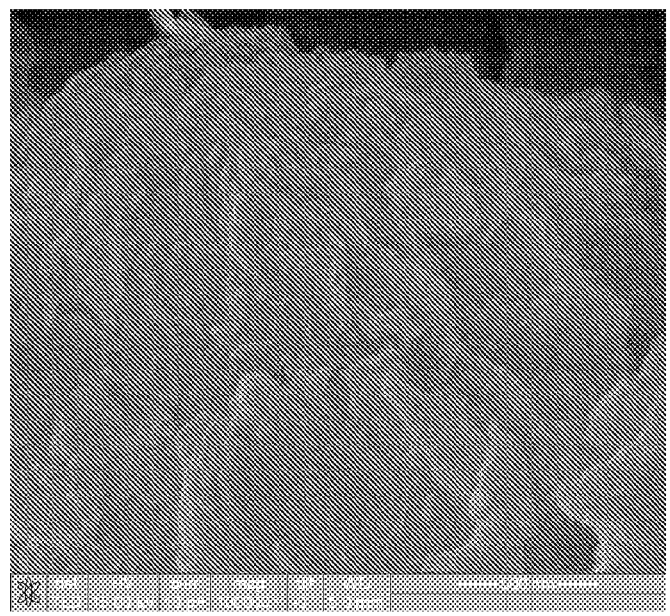

FIG. 20 Scanning Electron Microscopy (SEM) of the MgFeAl sample prepared according to Example 6. The analysis corresponds to the sample dried at 120° C.

Figure 21:
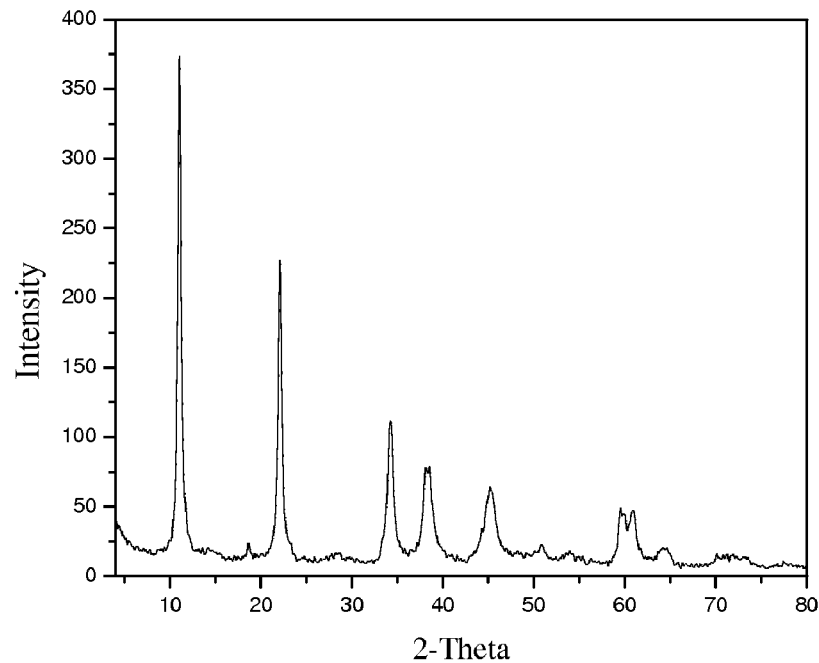

FIG. 21 X-ray diffraction pattern of the multimetallic anionic clay MgOHFeAl, molar ratio $M^{2+}/M^{3+}$ of 3, prepared according to Example 7.

Figure 22:
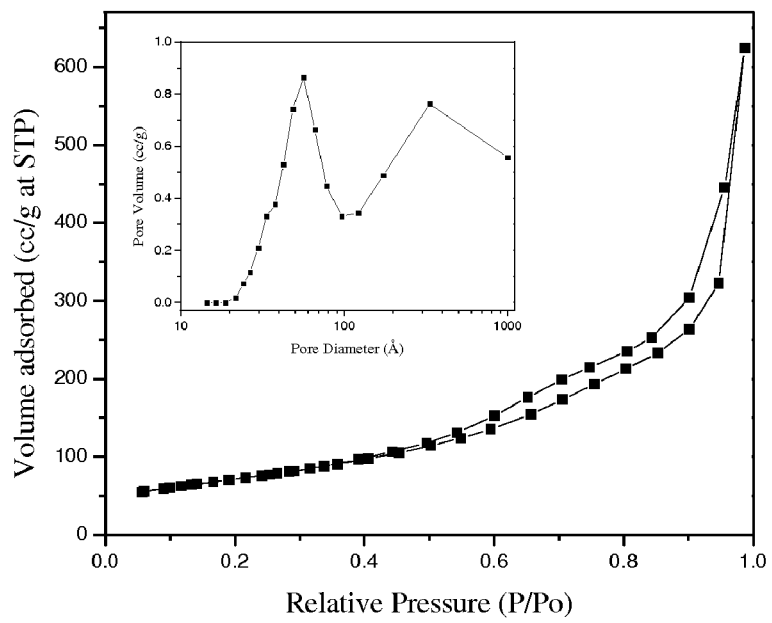

FIG. 22 Textural analysis of the MgOHFeAl sample prepared according to Example 7, the sample was previously calcined at 500° C./4 hours.

Figure 23:
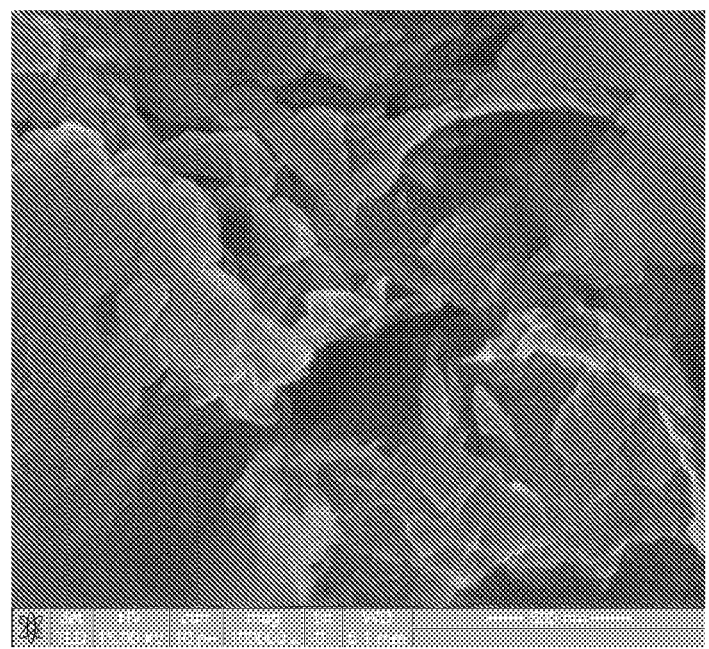

FIG. 23 Scanning Electron Microscopy (SEM) of the MgOHFeAl sample prepared according to Example 7.

Figure 24:
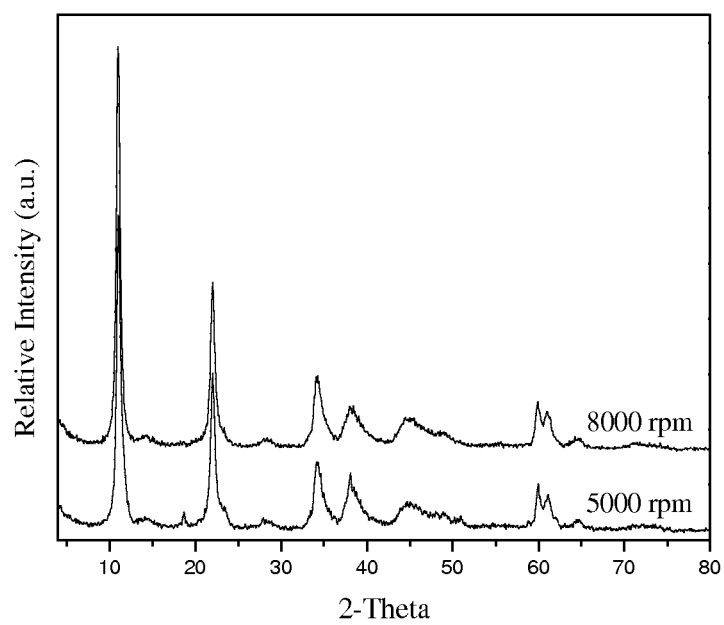

FIG. 24 X-ray diffraction pattern of two materials prepared according to Example 1. After adding the product resulting from (A) and (B), the slurries were dispersed at 5000 and 8000 rpm, respectively. The rest of the synthesis conditions remained constant.

Figure 25:
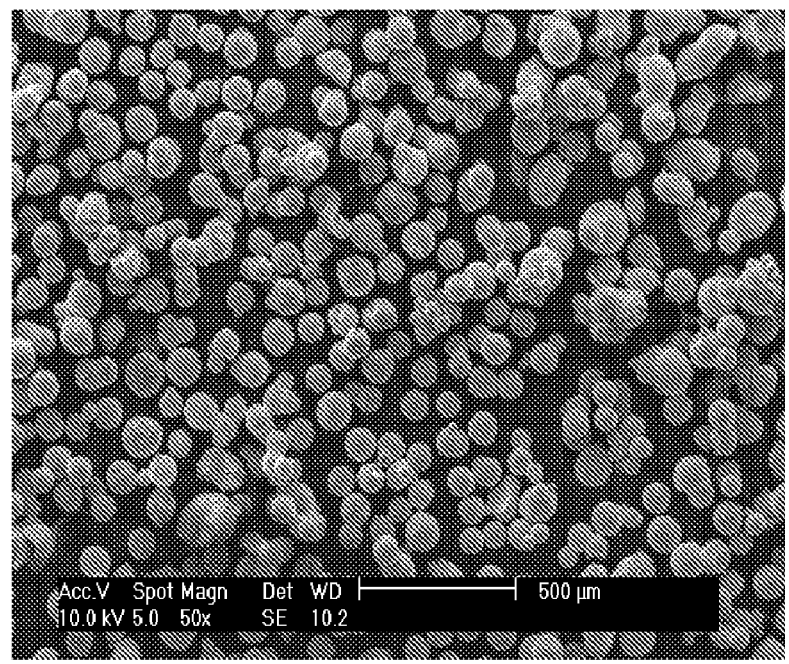

FIG. 25 Scanning Electron Microscopy (SEM) of the spray dried MgFeAl sample prepared according to Example 8.

DETAILED DESCRIPTION OF THE INVENTION

Thus, this invention is related to a new procedure to prepare multimetallic anionic clays which after thermal decomposition produce homogeneous multimetallic mixed oxides having the formula

where [M(II)]/[(M(III)], is the molar ratio between the divalent cations and the trivalent cations and is found between 0.5-10; M(II) represents one or a combination of two or more elements from group 2, 6-12 and 14 on the periodic table with valence equal to two; M(III) represents a combination of two or more elements from group 4-9, 13, Ce, and La, with valence equal to 3 and different from M(II), A represents any anion located between the layers composed of the aforementioned cations, n− represents the interlaminar anion's negative electronic charge and may be from −1 to −8, m represents the water molecules present as hydration water or as water present in the interlaminar region and can be from 0-2, x=0.09 to 0.67, said process comprising:
a) dissolving one, two, or more water-soluble divalent and/or trivalent metal precursors in water, maintaining control over the water/solid weight ratio,
b) adding one, two, or more water-insoluble divalent and/or trivalent metal precursors in powder form or in water suspension form, or a combination of both, and homogenizing with a high-speed stirrer between 4000 and 10000 rpm, at temperatures between 0-100° C. (preferably between 10-40° C.) from 0.1 to 12 hours, preferably between 1-6 hours,
c) mixing the solution (a) and the suspension (b) to form anionic clay at a pH between 6 and 12, preferably between 8 and 10.
d) Optionally, in the cases that require adjusting the reaction mixture's pH to obtain a pure MAC structure the following will be added:
   i) 0.1-10 molar acid solutions, preferably 1-5 M of $HNO_3$, HCl, acetic acid, formic acid, or any inorganic or organic acid that does not require washes in order to eliminate undesirable ions, or any combination thereof, or
   ii) 0.1-10 molar alkaline solutions, preferably 1-5M of $(NH_4)_2CO_3$, $NH_4OH$, ammonium phosphate, urea, any alkaline compound that does not requires washes in order to eliminate undesirable ions, or any combination thereof,
e) dispersing the particles and, optionally, homogenizing the dispersed particles of the slurry's non-soluble components from step (c), whether it is before being added to the aqueous suspension or when they are already part thereof,
f) aging the reaction mixture at temperatures between 0-100° C., preferably between 60-85° C., from 0.1 hour to 10 days, preferably from 3-48 hours, at atmospheric pressure or in an autoclave at temperatures between 100-300° C., preferably from 100-200° C., at pressures greater than atmospheric pressure from 0.1 hour to 10 days, preferably from 3-48 hours.
g) drying the slurry at a temperature between 60 and 250° C., preferably between 90-120° C., with air, nitrogen, or a vacuum, or any combination thereof.

In the field of minerals, the anionic clays are commonly referred to as "mixed metal hydroxides". This term derives from the fact that, as noted above, the positively charged layers of the metal hydroxides may contain two or more different metal cations in different oxidation states, for instance, $Mg^{2+}$, $Ni^{2+}$, $Zn^{2+}$, $Al^{3+}$, $Fe^{3+}$, $Cr^{3+}$, etc.

Additionally and given the fact that X-ray diffraction patterns of many anionic clays are similar to that of the mineral known as hydrotalcite, $[Mg_6Al_2(OH)_{16}]$ $(CO_3).4H_2O$, it is common practice to refer them as "hydrotalcite-like compounds"; this term being widely used in scientific and patent literature for many years. In fact, the terms "anionic clays", "mixed metal hydroxides", "hydrotalcite-like compounds" are used indistinctively. For simplicity, the term "hydrotalcite-like" has been extensively used in the literature, since hydrotalcite itself has been the most studied anionic clay in the last decade. Nonetheless and for present purposes, and with the view of keeping the generality of this invention, the term "anionic clays" (unless otherwise indicated), comprises all natural and synthetic anionic clays, as well as hydrotalcite, and any other member of materials known as "hydrotalcite-like compounds". Moreover, and given its frequent use throughout this document, the term "multimetallic anionic clays" will be referred to as "MACs".

This invention pertains to the preparation of MACs, in addition to a procedure for obtaining a series of multimetallic mixed oxides derived from the thermal decomposition of the anionic clays prepared according to the invention. The physicochemical characteristics of the MACs are described in this invention. Due to the fact that a great variety of possible large-scale commercial applications exist, new processes that provide simple and economically viable alternatives are needed—processes in which the production of the material is carried out continuously, while complying with environmental requirements as well.

These materials can be used as heterogeneous basic catalysts in fine chemistry reactions for controlling SOx and NOx emissions, among other applications. In accordance with this invention, divalent cations precursors, such as: $Mg(NO_3)_2.6H_2O$, MgO, $Mg(OH)_2$, $Zn(NO_3)_2.6H_2O$, ZnO, $Zn(OH)_2$, $Ni(NO_3)_2.6H_2O$, NiO, $Ni(OH)_2$, $Cu(NO_3)_2.6H_2O$, $Cu(NO_3)_2.2½H_2O$, CuO, $Cu(OH)_2$, etc., and from those of the trivalent cations: boehmite, bayerite, gibbsite, $Al(NO_3)_3.9H_2O$, $Fe_2O_3$, $Fe(NO_3)_3.9H_2O$, chromates, etc., can be fed to a reactor where reaction conditions are adjusted in order to obtain an anionic clay. The reaction can be carried out under different conditions, resulting in the formation of a laminar compound that can be obtained directly drying the slurry.

The invention describes the preparation of multimetallic anionic clays through the dissolution in water of a divalent and/or a trivalent metal's soluble salt. Said dissolution will produce an adequate environment for incorporating the insoluble divalent and/or trivalent metal's precursor, which will finally result in the formation of the anionic clay. Such a reaction is carried out at room temperature or at higher temperatures. At temperatures greater than 100° C., the reaction is carried out, preferably, under autogenic conditions.

The invention also encompasses the use of metal precursors that, upon dissolving, produce acid solutions that can be modulated in accordance with the metal precursor's concentration, thus allowing peptization in the case of boehmite as an aluminum source. In this context, this step avoids the use of organic or inorganic acids that would introduce an additional step into the process.

Furthermore, the concept that the reaction mixture's pH can be adjusted, if needed, is introduced, increasing or decreasing the quantity of initial divalent and/or trivalent metal source, as well as the quantity of water used as a reaction medium. The invention even provides for the use of acids and bases as means to adjust the pH (in case it is required) of the precursor reaction mixtures for the formation of the anionic clays described here. Said organic and inorganic acids or bases may be added to the slurry at the beginning, middle, or end of the reaction, as well as individually to the reagents, before being combined for the slurry formation.

Within the recommended acids and bases, formic acid, acetic acid, nitric acid, oxalic acid, ammonium phosphate, phosphoric acid, ammonium hydroxide, urea, ammonium carbonate, and ammonium bicarbonate are found, since this type of acids and bases does not introduce into the reaction mixture undesirable ions that require the final product to be subjected to washes.

The non-soluble components may be dispersed or homogenized in an aqueous medium, be it before adding them to the reaction mixture or be it when these are already a part of the reaction mixture. For purposes of this invention, the terms disperse or dispersing are defined as "any method that results in particle size reduction". Such a reduction in particle size produces at the same time the formation of active surfaces and/or particle heating. Likewise, for purposes of this invention, the terms homogenize or homogenizing are defined as "to reduce to small particles of uniform size and distribute evenly in the liquid medium". Thus, in those instances when homogenation is required, the non-soluble components are dispersed and homogenized to produce small, uniform-sized particles that are evenly distributed. To these ends, the use of instruments that can introduce ultrasound waves into the slurry such as ball mills, high shear mixers, colloidal mixers, and electric transducers may be used to disperse or, optionally, homogenize the insoluble particles depending upon the intensity of the mixing conditions used, such as the stirring speed, time of mixing, and the like.

This invention provides for control of the water ratio necessary to prepare the multimetallic anionic clays. Such a ratio is defined as the water/solid weight ratio, that is, the mass of water used to prepare the reaction mixture, divided by the mass of solid precursors. Said water/solid weight ratio may be from 0.1 up to 1000, preferably between 5-500. Due to the compromise between the quantity of water and the dispersibility of the soluble and insoluble compounds, it is essential that strict control be maintained over these parameters. At the same time, through control of the water/solid weight ratio, it will be possible to avoid wasting the aqueous solvent during the filtering and/or drying processes, thus involving an additional component in the economy of the synthesis procedure described in this invention.

Another important embodiment of this invention is the control over the reaction mixture's stirring time and speed, since it is through control over these parameters that the final multimetallic anionic clay's purity, crystal size and density can be modulated. Said stirring speed may be from 1 up to 1000 revolutions per minute (rpm), preferably between 50-500 rpm. The aging times may be from 0.1 hour up to 10 days, preferably between 3-48 hours.

The aging temperatures of the anionic clays prepared according to this invention may be from 0-100° C. (preferably between 60-85° C.) at atmospheric pressure. At temperatures of 100-300° C. (preferably between 100-200° C.), and pressures greater than atmospheric pressure, the aging process will take place in an autoclave. The resulting product may have, for example, an average bulk density (ABD) of from 0.1-5 g/cc, preferably between 0.4-2 g/cc.

This invention's process for producing multimetallic anionic clays allows a large variety of anionic clay compositions to be obtained that are susceptible to anionic exchange processes, for example with the following anions: hydroxyls, chlorides, bromides, metasilicates, persulfates, dibasic phosphates, selenates, sulfides, sulfates, sulfites, tellurites, tetraborates, thiosulfates, trisilicates, dichromates, molybdates, hexabromoplatinates, hexachloroiridates, hexacloropalladates, hexachloroplatinates, ferric bisulfates, tetrachloropalladates, tetrathiotung states, tungstates, dichromates, metavanadates, dimolybdates, chromates, tetrachlorocuprates, tetracyanonickelates, stanates, arsenates, selenites, silicates, tellurates, heteropolyanions, phthalocyanines, ADN, and their mixtures, present in the interlaminar region.

In the method described in this invention, anions other than carbonate or their mixtures, introduced inside the reaction medium as a soluble salt or adsorbed from the atmosphere during synthesis, are incorporated inside the interlaminar region to compensate the positive charges that are produced in the process of forming the anionic clay. In addition, the final product may be dried directly or spray dried to form microspheres or it may be given a specific form for its use, be that in the form of extrudes, pills, microspheres, etc.

After being subjected to a heating process around 400° C., the MgAl anionic clays generally form MgAl solid solutions, as well as forming $MgAl_2O_4$ spinels at temperatures greater than 800° C. When used as an adsorbent, for example in the adsorption of SOx produced in energy generation processes or in petroleum refining processes such as the FCC process, the anionic clay is heated to temperatures between 650-732° C. for its activation and its efficient use as SOx adsorbent.

Therefore, the invention also includes the process in which the MACs prepared according to the invention are heated at temperatures between 400-1200° C., preferably between 450-732° C., for the formation of solid solutions and/or spinels to be used as catalysts, adsorbents, ionic exchangers, flame retardants, supports, and applications in the medical field.

The MACs prepared according to the invention are represented by the following formula:

$$[M(II)_{1-x}M(III)_x(OH)_2](A^{n-}{}_{x/n}) \cdot mH_2O,$$

where $[M(II)]/[(M(III)]$, is the molar ratio between the divalent cations and the trivalent cations and is between 0.5-10; M(II) represents one or a combination of two or more elements from group 2, 6-12 and 14 on the periodic table with valence equal to two; M(III) represents a combination of two or more elements from group 4-9, 13, Ce, and La, with valence equal to 3 and different from M(II).

A represents any anion located between the layers composed of the aforementioned cations.

n– represents the interlaminar anion's negative electronic charge and may be from –1 to –8.

m represents the water molecules present as hydration water or as water present in the interlaminar region and can be from 0-2.

x=0.09 to 0.67

Since the MAC production process does not require washing or filtering the final product, as occurs with the anionic clays prepared by coprecipitation, the production of filtered waste is eliminated. Furthermore, this allows compliance with the growing environmental regulations imposed upon industrial production processes.

Divalent Metal Sources

The divalent metal sources that can be used include the metal salts from the compounds of group 2, 6-12 and 14, such as MgO, $Mg(OH)_2$, magnesium acetate, hydromagnesite, magnesium formato, magnesium hydroxyacetate, magnesium carbonate, magnesium bicarbonate, magnesium nitrate, magnesium sulfate, magnesium chloride, dolomite, sepiolite, or any combination of these. In addition to the magnesium source, other divalent metal sources can be added, such as compounds that contain $Mg^{2+}$, $Ni^{2+}$, $Cu^{2+}$, $Ca^{2+}$, $Fe^{2+}$, $Co^{2+}$, $Sn^{2+}$, $Mn^{2+}$, $Cr^{2+}$, $Cd^{2+}$, $V^{2+}$, $Sr^{2+}$, $Ba^{2+}$, and $Zn^{2+}$, and their mixtures, preferably in the form of oxides, hydroxides, hydroxycarbonates, carbonates, and bicarbonates, although chlorides, sulfates, phosphates, acetates, hydroxyacetates, formatos, oxalates, borates, tungstates, molybdates, vanadates, or their mixtures may also be used.

Trivalent Metal Sources

The trivalent metal sources recommended in this invention include the metal salts from the group 4-9 and 13, Ce and La compounds. Furthermore, this invention includes the use of boehmites as an aluminum source. This includes boehmites and pseudoboehmites. For example, boehmite and/or pseudoboehmite with crystal sizes between 10 and 100 Å, preferably between 20 and 50 Å, and particle sizes between 1 and 100 μm, preferably between 20 and 60 m, and a dispersibility index in acid between 50 and 100%, preferably between 70 and 95% may be used. Other aluminum sources can even be used, such as gibbsite, bayerite, norstrandite, trihydrated alumina, BOC, or any combination of these. Other adequate trivalent metal sources include compounds that contain $Al^{3+}$, $Fe^{3+}$, $Ga^{3+}$, $Co^{3+}$, $Mn^{3+}$, $Sc^{3+}$, $Cr^{3+}$, $La^{3+}$, $Ce^{3+}$, $Ga^{3+}$, or mixtures of said compounds, preferably in the form of oxides, hydroxides, hydroxycarbonates, carbonates, and bicarbonates, although nitrates, chlorides, sulfates, phosphates, acetates, hydroxyacetates, formatos, oxalates, borates, tungstates, molybdates, vanadates, or mixtures of these may also be used.

Preparation Conditions

According to the invention, MAC preparation can be carried out under "thermal" or "hydrothermal" conditions. Within the confines of this invention, the term "thermal" indicates that the reaction temperature is found between 0° and 100° C. in air atmosphere or under any other atmosphere at atmospheric pressure. The term "hydrothermal" is defined as the reaction that is carried out at temperatures greater than 100° C. and at pressures higher than atmospheric pressure.

The MAC preparation methodology includes the following steps:

a) Dissolving a water soluble divalent and/or trivalent metal precursor (maintaining a water/solid weight ratio between 0.1-1000, preferably from 5-500), which will fulfill two main functions: 1) Providing the necessary quantity of divalent and/or trivalent cations for the formation of the multimetallic anionic clay, and 2) supplying the necessary characteristics to the reaction medium in order to facilitate the reaction between the soluble and insoluble precursors.

b) Adding a water insoluble divalent and/or trivalent metal precursor, in powder or slurry form, or a combination of both, and to homogenize the reaction mixture at temperatures between 0-100° C., preferably between 10-40° C., from 0.1 to 24 hours (preferably between 1 hour-3 hours) at atmospheric pressure in air atmosphere or under any other gas stream.

c) Optionally, the pH can be adjusted in steps a) and/or b) by adding an acid or a base to provide a pH between 1-11.

d) Dispersing the particles and, optionally, homogenizing the dispersed particles of the slurry's non-soluble components, whether it be before being added to the suspension, or when they are already part of it.

e) Aging the reaction mixture at temperatures between 0-100° C. (preferably between 60-85° C.) from 0.1 hour-10 days (preferably between 3-48 hours) with a stirring speed of 1-1000 rpm, preferably between 50-500 rpm, at atmospheric pressure or to put it into an autoclave and age it at temperatures of 100-300° C. (preferably between 100-200° C.) at pressures greater than atmospheric pressure from 0.1 hour to 10 days (preferably between 3-48 hours) with a stirring speed between 1-1000 rpm, preferably between 50-500 rpm.

f) Drying the slurry in an oven at temperatures between 70-150° C., preferably between 90-120° C.

g) Optionally, spray drying the slurry obtained in e) in order to obtain microsphered multimetallic anionic clays.

h) Optionally, the MACs are submitted to a thermal treatment at temperatures between 400-1200° C., preferably between 450-800° C., for periods of 1-24 hours (preferably between 4-8 hours) for the formation of solid solutions and/or spinels.

i) Optionally, the calcination products obtained in h) are rehydrated in an aqueous medium between 50-100° C., preferably between 60-90° C., for periods of 0.1-24 hours (preferably between 4-18 hours) in order to form a multimetallic anionic clay again.

j) During the rehydration process of the calcination products obtained in h), the aqueous medium may contain additives and/or anions other than those that the multimetallic anionic clay precursor originally contained.

The multimetallic anionic clays (MACs) prepared according to this invention were analyzed through different techniques, for the determination of specific area, pore diameter, pore volume, composition of crystalline phases, and the morphology of the particles through scanning electron microscopy.

The MACs prepared via the methods described in this invention exhibit the chemical and physical properties (chemical composition, powder X-ray diffraction pattern, specific surface area, volume, and pore size distribution) characteristic of the anionic clays prepared by conventional synthesis methods. For example, the calcined multimetallic anionic clays of the present invention may have a specific surface area between 30 and 400 $m^2/g$, preferably between 100 and 300 m2/g, total pore volume between 0.2 and 1.5 $cm^3/g$, preferably between 0.4 and 1.2 $cm^3/g$, and average pore diameter between 2 and 100 nm, preferably between 4 and 40 nm.

The starting raw materials such as, boehmite, MgO and/or MgOH, characterized by X-ray diffraction patterns in FIGS. 1-4, can be transformed into anionic clays, as shown by X-ray diffraction patterns in FIGS. 5, 8, 9, 12, 15, 18, 21, 24. Moreover, the complete transformation of boehmite, MgO and/or MgOH into pure anionic clays will strongly depend on the preparation conditions, particularly aging time and stirring rate, as can be observed in FIGS. 8 and 24. As well, the preparation of an anionic clay containing only two cations, typically $Mg^{2+}$ and $Al^{3+}$, will lead to a material known as hydrotalcite and represented by the formula $[Mg_6Al_2(OH)_{16}](CO_3) \cdot 4H_2O$ and characterized by X-ray diffraction pattern in FIG. 5. However, when three or more cations are included in the preparation media and due to differences in solubility and hydrolysis rates, there is a risk of forming different compounds from an anionic clay, or mixture of compounds thereof. Accordingly, and from X-ray diffraction patterns in FIGS. 9, 12, 15, 18 and 21, the preparation procedure disclosed in this invention yields pure anionic clay phases wherein three cations made up the layers, without any significant segregation of other non-anionic clay compounds.

The introduction of other cations, different from and in addition to $Mg^{2+}$ and/or $Al^{3+}$, into the layers of the anionic clays alters the surface properties of the particles and their agglomeration. As it is well known, agglomeration properties of particles affect the final pore size and structure of a given solid porous material. The anionic clays obtained in this invention are characterized by distinctive pore size distributions, depending on the nature of the third cation, different from $Mg^{2+}$ and/or $Al^{3+}$, as shown in FIGS. 6, 10, 13, 16, 19 and 22. The corresponding morphology, which is characterized by particle flakes of different sizes and degree of accommodation, reflects these differences in agglomeration properties induced by the incorporation of third cations, different from and in addition to $Mg^{2+}$ and/or $Al^{3+}$, as can be observed from scanning electron microscopy images in FIGS. 7, 11, 14, 17, 20, 23, and 25.

The materials obtained presented the X-ray diffraction patterns characteristic of hydrotalcite as is shown in FIGS. 5, 8, 9, 12, 15, 18, 21, and 24. In some cases, the presence of non-reactive brucite and/or boehmite was identified, which disappears by increasing the aging time, the revolutions per minute, and/or adjusting the pH with $NH_4OH$ or with urea or with any acid that does not introduce undesirable ions. Table 1 presents the results of the $N_2$ adsorption-desorption at $-196°$ C. The textural properties of the solids obtained are very similar to those obtained in materials prepared by conventional synthesis methods. Table 2 shows the chemical composition of the compounds prepared according to this invention; these were determined from elemental analysis by X-ray fluorescence and from thermal analyses. Table 3 presents the physical properties of the sample obtained according to the procedure described in Example 6 and spray dried at 400° C., Example 8.

TABLE 1

Textural properties of the anionic clays prepared according to the invention

| Simple* | Example (#) | BET ($m^2$/g) | Pore Volume (cc/g) | Average Pore Diameter (Å) |
|---|---|---|---|---|
| MgAl | 1 | 227 | 0.987 | 174 |
| MgNiAl | 3 | 230 | 0.882 | 154 |
| MgCuAl | 4 | 223 | 0.852 | 153 |
| MgZnAl | 5 | 140 | 0.428 | 124 |
| MgFeAl | 6 | 145 | 0.495 | 136 |
| MgOHFeAl | 7 | 256 | 0.966 | 151 |

*The samples were previously calcined at 500° C./4 h

TABLE 2

Chemical composition of the anionic clays prepared according to the invention.

| Sample | developed Formula | Ratio $M^{2+}/M^{3+}$ |
|---|---|---|
| MgAl | $[Mg_{0.754} Al_{0.246} (OH)_2] (CO_3)_{0.123} \cdot 0.574 H_2O$ | 3.07 |
| MgNiAl | $[Mg_{0.662} Al_{0.264} Nl_{0.074} (OH)_2] (CO_3)_{0.132} \cdot 0.536 H_2O$ | 2.79 |
| MgCuAl | $[Mg_{0.708} Al_{0.241} Cu_{0.050} (OH)_2] (CO_3)_{0.121} \cdot 0.450 H_2O$ | 3.14 |
| MgZnAl | $[Mg_{0.676} Al_{0.256} Zn_{0.068} (OH)_2] (CO_3)_{0.128} \cdot 0.490 H_2O$ | 2.91 |
| MgFeAl | $[Mg_{0.756} Al_{0.180} Fe_{0.064} (OH)_2] (CO_3)_{0.122} \cdot 0.535 H_2O$ | 3.10 |
| MgOHAlFe | $[Mg_{0.812} Al_{0.130} Fe_{0.058} (OH)_2] (CO_3)_{0.094} \cdot 0.447 H_2O$ | 4.33 |

TABLE 3

Physical properties of the MgFeAl sample, obtained according to the procedure described in Example 6 and spray dried at 400° C., Example 8.

| Simple* | Average Bulk Density (g/cc) | Attrition Index, 732° C. | BET ($m^2$/g)* | Chemical Composition | | |
|---|---|---|---|---|---|---|
| | | | | MgO | $Al_2O_3$ | $Fe_2O_3$ |
| MgFeAl | 0.96 | 1.2 | 136 | 62.2 | 20.0 | 13.7 |

*Calcined at 500° C./4 hours

EXAMPLES

Example 1

Figure 1:
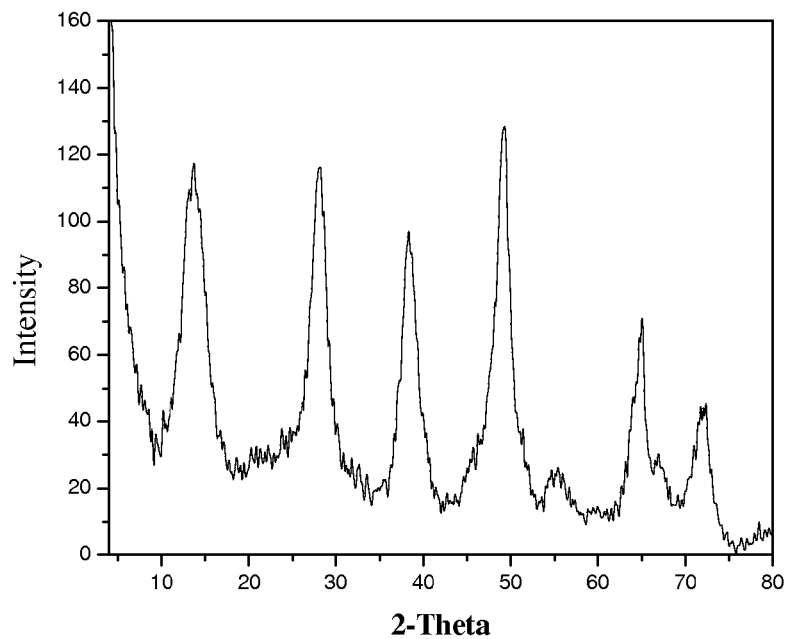
FIG. 1 X-ray diffraction pattern of the boehmite HiQ-10.
Figure 2:
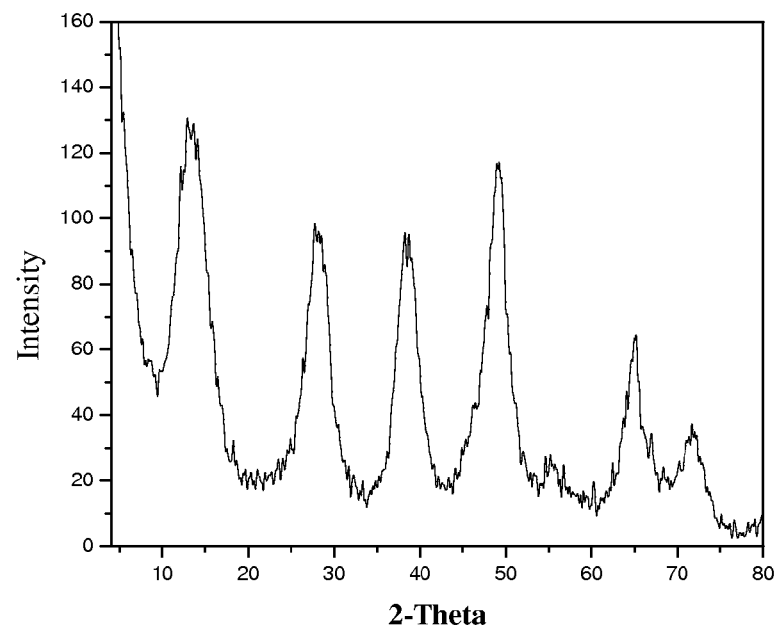
FIG. 2 X-ray diffraction pattern of the boehmite HiQ-30.
Figure 3:
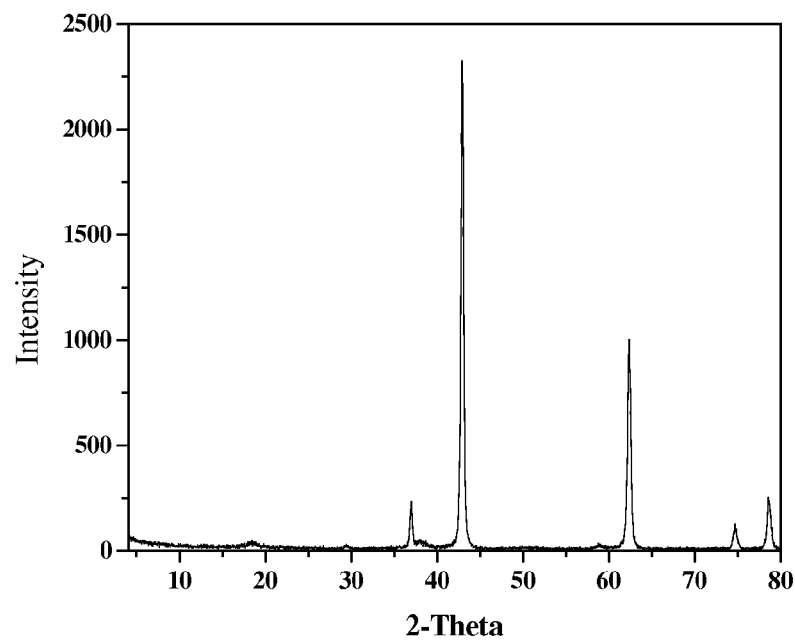
FIG. 3 X-ray diffraction pattern of the MgO REMAG AC.
Figure 4:
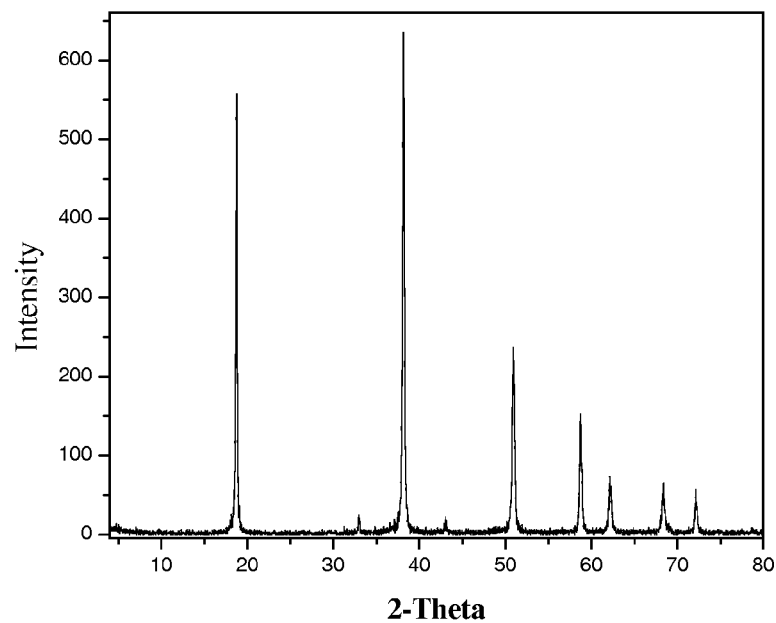
FIG. 4 X-ray diffraction pattern of the Mg(OH)$_2$ HIDROMAG FR.
Figure 5:
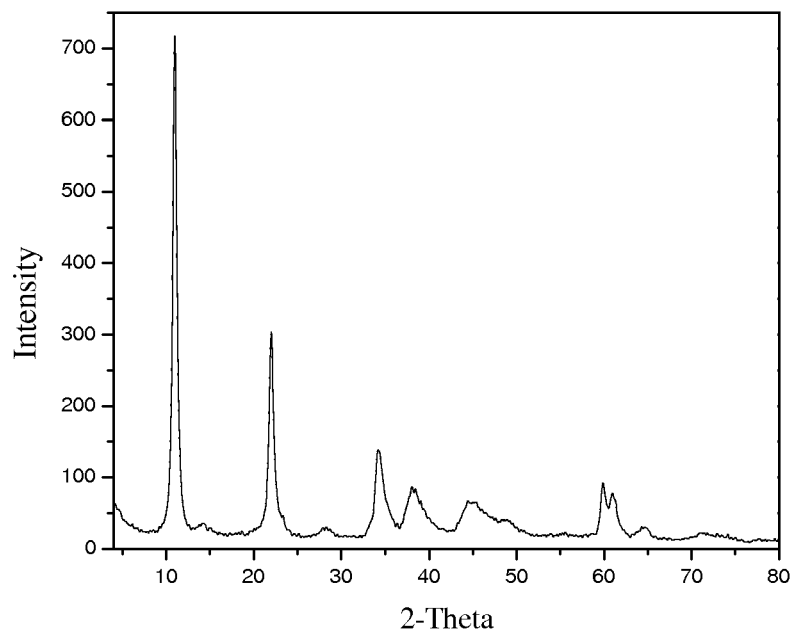
FIG. 5 X-ray diffraction pattern of the material described in Example 1, anionic clay MgAl with a molar ratio of $M^{2+}/M^{3+}=2.8$.
Figure 6:
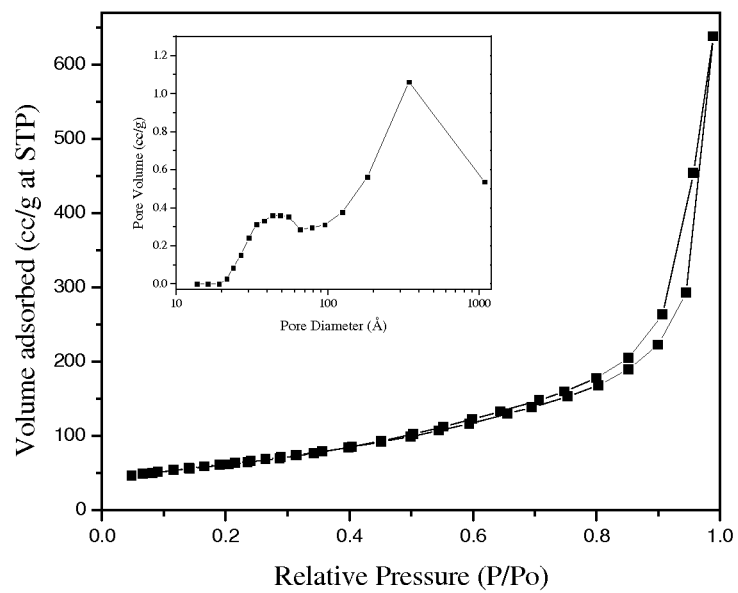
FIG. 6 Textural analysis of the MgAl sample prepared according to Example 1, the sample was previously calcined at 500° C./4 h.
Figure 7:
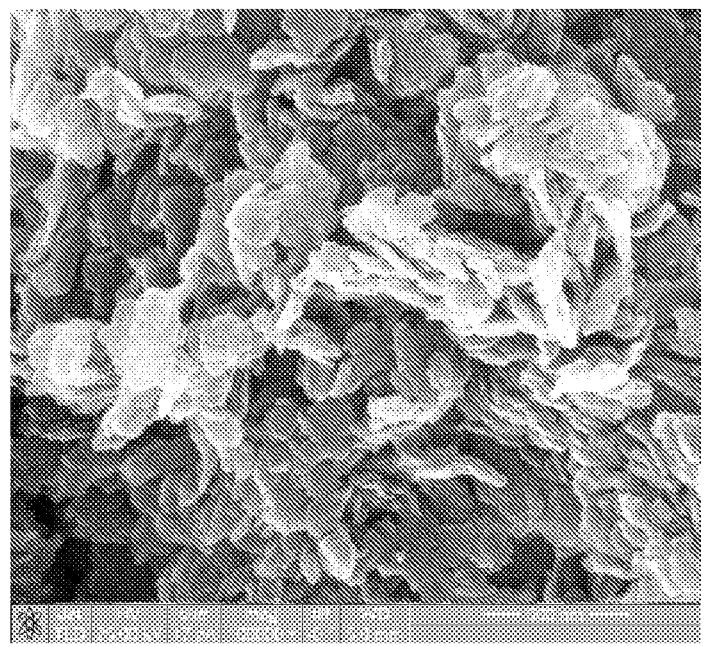
FIG. 7 Scanning Electron Microscopy (SEM) of the MgAl sample prepared according to Example 1.

58.03 g of MgO are dispersed in 290 mL of bidistilled $H_2O$ at 5000 rpm for thirty minutes (A). 43.45 g of $Al(NO_3)_3.9H_2O$ are dissolved separately in 548 mL of bidistilled water. Once the aluminum nitrate is dissolved, 25.33 g of HiQ-10 boehmite are added and the mixture is dispersed at 5000 rpm for thirty minutes (B). The $H_2O$/solid weight ratio was 10. Thereafter, the product resulting from (A) to (B) is added and dispersed for one hour at 8000 rpm. The slurry is aged at 80° C. for 8 hours with a stirring speed of 350 rpm. The slurry's final pH was 8.4 (20° C.). Finally, the sample is filtered and dried at 100° C. for 12 hours. This material is designated MgAl. X-ray diffraction pattern, pore size distribution and morphology of Example 1 are represented in FIGS. 5, 6 and 7, respectively.

Example 2

Figure 8:
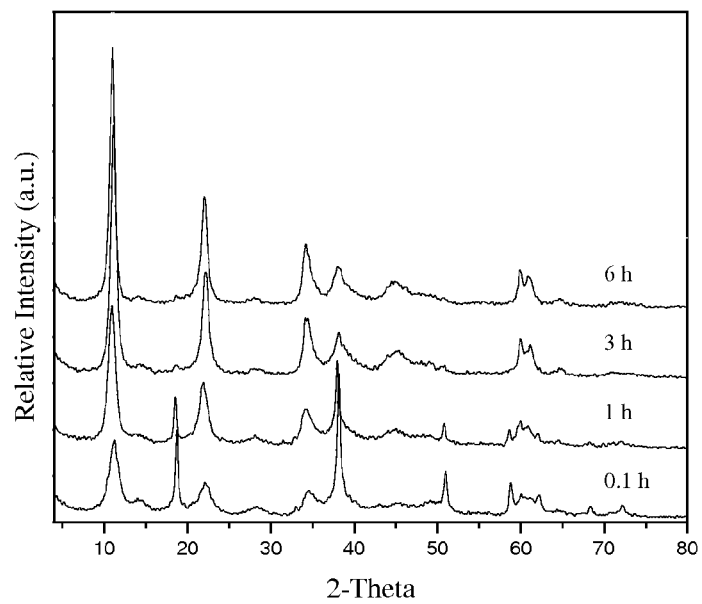
FIG. 8 X-ray diffraction pattern of the anionic clay MgAl-1 described in Example 2, with a nominal $M^{2+}/M^{3+}=2.8$ molar ratio. X-ray patterns were taken after 0.1, 1, 3 and 6 hours.

47.43 g of MgO are dispersed in 237 mL of bidistilled $H_2O$ and the obtained slurry is stirred at 200 rpm for 10 min (A). Separately, 39.01 g de $Al(NO_3)_3.9H_2O$ are dissolved in 512 mL of bidistilled $H_2O$. Once dissolution is completed, 17.05 g of HiQ-10 boehmite is added and the mixture is stirred at 300 rpm for 10 min (B). Then, the resulting product of (A) is added to (B) and the resulting slurry is aged at 80° C. for 6 hours at 400 rpm. Aliquot samples were taken at 0.1, 1, 3 and 6 hours and their corresponding XRD patterns are shown in FIG. 8. The samples were filtered and dried at 100° C. This material is designated as MgAl-1. X-ray diffraction pattern of Example 2 is represented in FIG. 8.

Example 3

Figure 9:
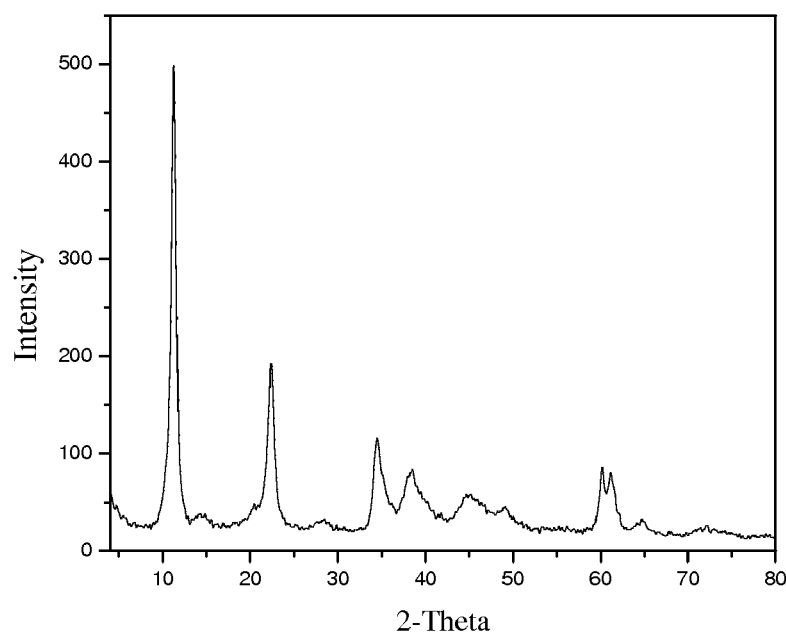
FIG. 9 X-ray diffraction pattern of the material prepared according to Example 3 for the preparation of an MgNiAl anionic clay with a molar ratio of $M^{2+}/M^{3+}=2.8$.
Figure 10:
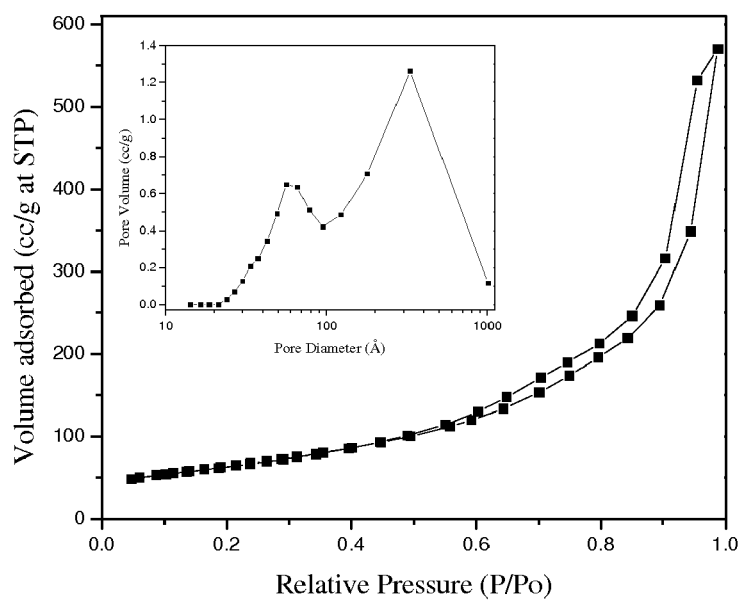
FIG. 10 Textural analysis of the MgNiAl sample prepared according to Example 3, the sample was previously calcined at 500° C./4 hours.
Figure 11:
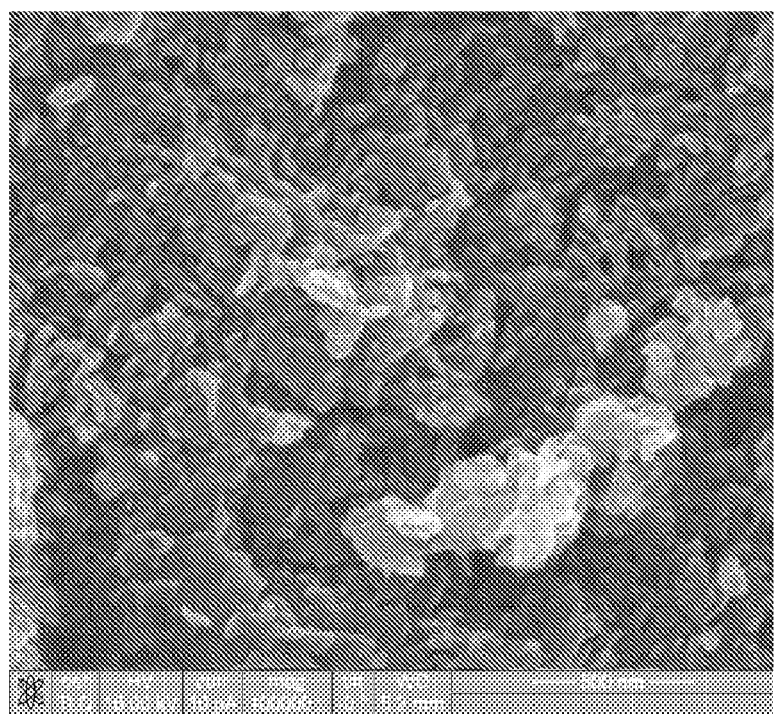
FIG. 11 Scanning Electron Microscopy (SEM) of the MgNiAl sample prepared according to Example 3.

33.82 g of MgO are dispersed in 300 mL of bidistilled $H_2O$ at 5000 rpm for one hour (A). 22.51 g of $Al(NO_3)_3.9H_2O$ and 25.02 g of $Ni(NO_3)_2.6H_2O$ are dissolved separately in 290 mL of bidistilled water. Once the aluminum and nickel nitrates are dissolved, 16.95 g of HiQ-10 boehmite are added and the mixture is dispersed at 5000 rpm for one hour (B). The $H_2O$/solid ratio was 10. Afterward, the product resulting from (A) to (B) is added and dispersed for one hour at 8000 rpm. The slurry is aged at 80° C. for 8 hours with a stirring speed of 350 rpm. The slurry's final pH was 7.8 (18° C.). Finally, the sample is filtered and dried at 100° C. for 12 hours. This material is designated MgNiAl. X-ray diffraction pattern, pore size distribution and morphology of Example 3 are represented in FIGS. 9, 10 and 11, respectively.

Example 4

Figure 12:
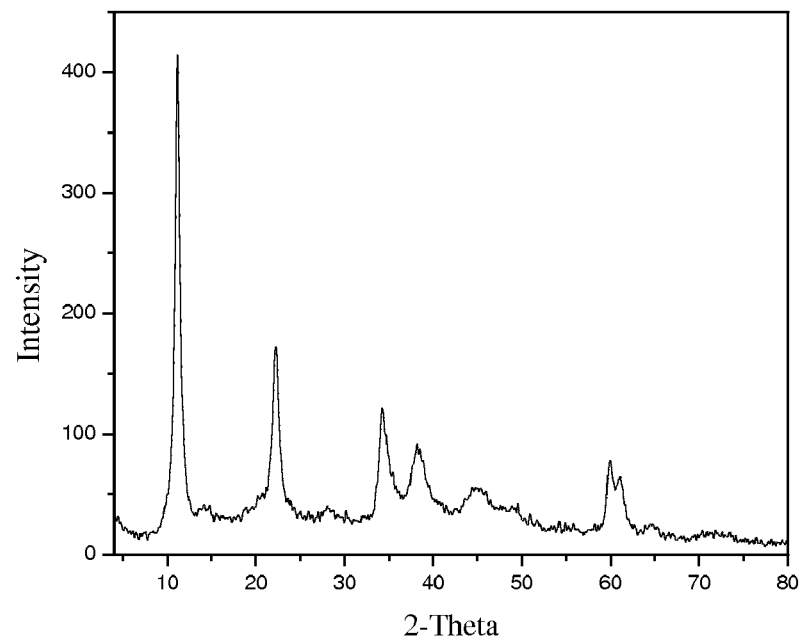
FIG. 12 X-ray diffraction pattern of the material prepared according to Example 4 in order to obtain the trimetallic anionic clay MgCuAl with a molar ratio of $M^{2+}/M^{3+}$ of 2.8.
Figure 13:
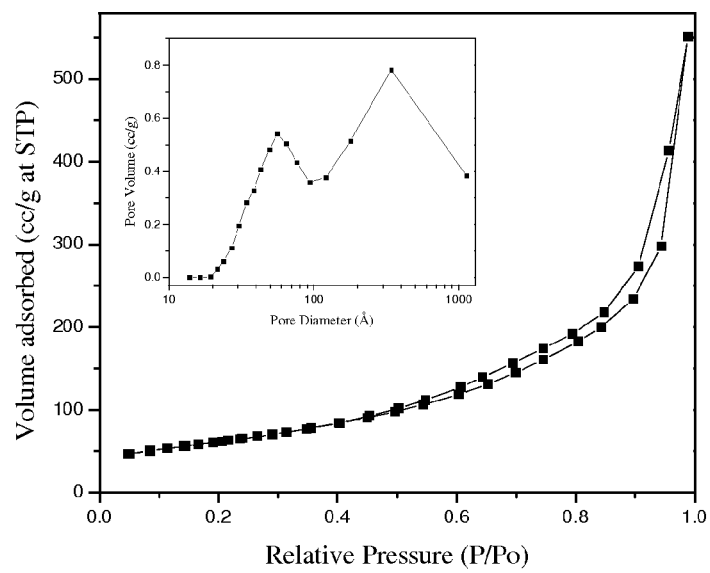
FIG. 13 Textural analysis of the MgCuAl sample prepared according to Example 4, the sample was previously calcined at 500° C./4 hours.
Figure 14:
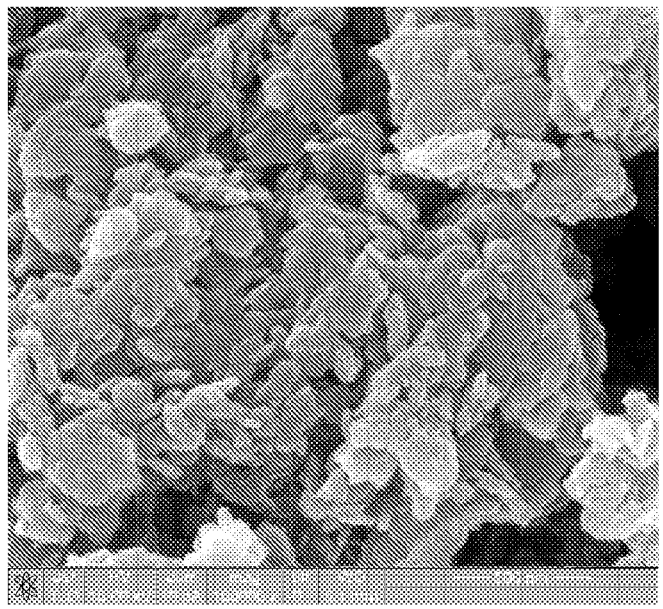
FIG. 14 Scanning Electron Microscopy (SEM) of the MgCuAl sample prepared according to Example 4.

34.16 g of MgO are dispersed in 300 mL of bidistilled $H_2O$ at 8000 rpm for two hours (A). 22.51 g of $Al(NO_3)_3.9H_2O$ and 16.22 g of $Cu(NO_3)_2.2½H_2O$ are dissolved separately in 297 mL of bidistilled water. Once the aluminum and copper nitrates are dissolved, 16.93 g of HiQ-10 boehmite are added and the mixture is dispersed at 8000 rpm for two hours (B). The $H_2O$/solid ratio was 10. Thereafter, the product resulting from (A) to (B) is added and dispersed for two hours at 8000 rpm. The slurry is aged at 80° C. for 6 hours with a stirring speed of 400 rpm. The slurry's final pH was 7.9 (21° C.). Finally, the sample is filtered and dried at 100° C. for 12 hours. This material is designated MgCuAl. X-ray diffraction pattern, pore size distribution and morphology of Example 4 are represented in FIGS. 12, 13 and 14, respectively.

Example 5

Figure 15:
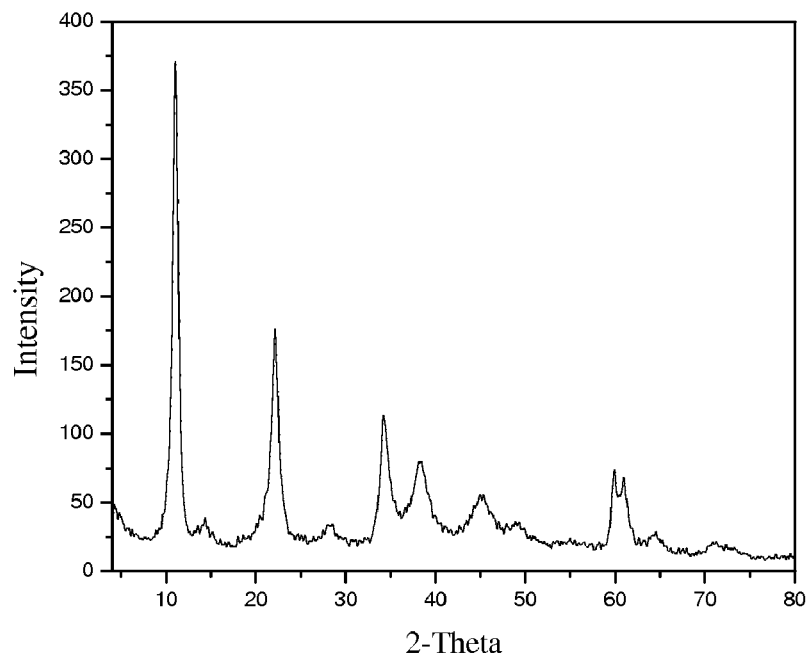
FIG. 15 X-ray diffraction pattern of the trimetallic anionic clay MgZnAl with a synthesis molar ratio of $M^{2+}/M^{3+}$ of 2.8, prepared according to Example 5.
Figure 16:
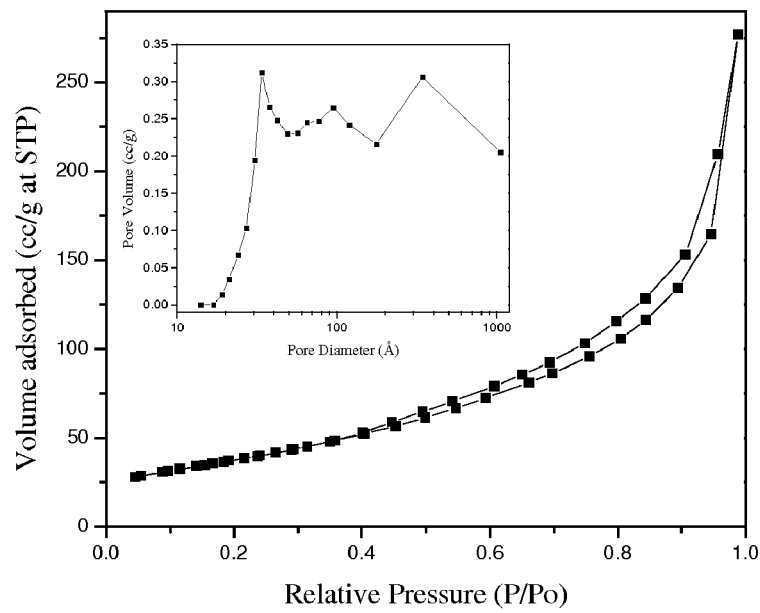
FIG. 16 Textural analysis of the MgZnAl sample prepared according to Example 5. the sample was previously calcined at 500° C./4 hours.
Figure 17:
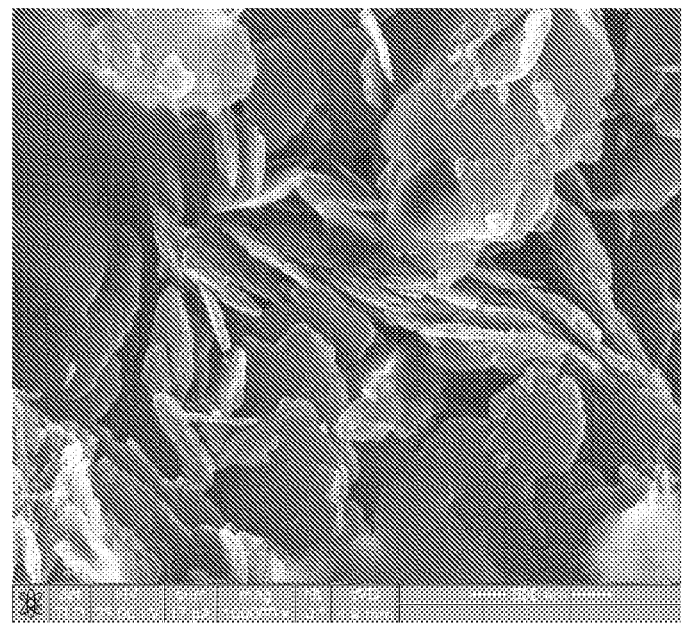
FIG. 17 Scanning Electron Microscopy (SEM) of the MgZnAl sample prepared according to Example 5.

34.12 g of MgO are dispersed in 200 mL of bidistilled $H_2O$ at 8000 rpm for two hours (A). 24.72 g of $Al(NO_3)_3.9H_2O$ and 22.96 g of $Zn(NO_3)_2.6H_2O$ are dissolved separately in 389 mL of bidistilled water. Once the aluminum and zinc nitrates are dissolved, 16.50 g of HiQ-10 boehmite are added, and the mixture is dispersed at 8000 rpm for two hours (B). The $H_2O$/solid ratio was 10. Afterward, the product resulting from (A) and (B) is added and dispersed for two hours at 8000 rpm. The slurry is aged at 80° C. for 8 hours with a stirring speed of 400 rpm. The slurry's final pH was 7.8 (25° C.). Finally, the sample is filtered and dried at 100° C. for 12 hours. This material is designated MgZnAl. X-ray diffraction pattern, pore size distribution and morphology of Example 5 are represented in FIGS. 15, 16 and 17, respectively.

Example 6

Figure 18:
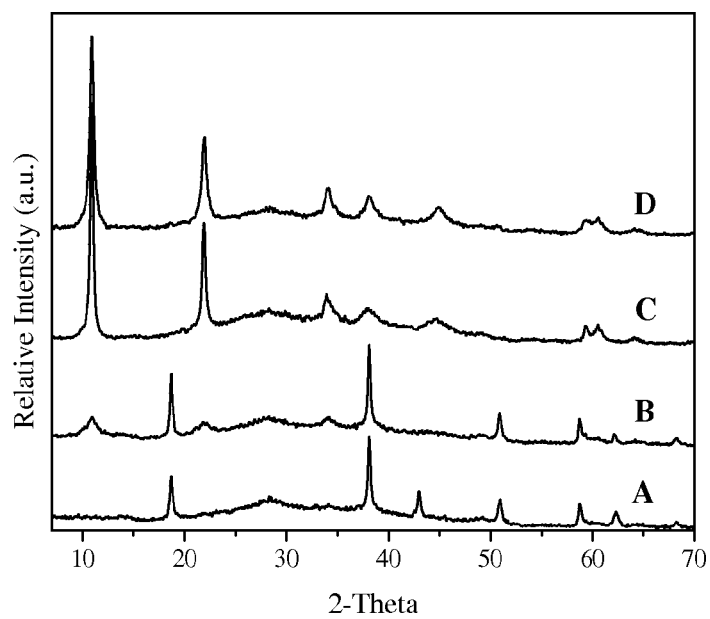
FIG. 18 X-ray diffraction patterns of the multimetallic anionic clay MgFeAl with a nominal molar ratio $M^{2+}/M^{3+}$ of 3, prepared according to Example 6.

364.33 g of $Fe(NO_3)_3.9H_2O$ are dissolved in 6.24 L of bidistilled water. 154.69 g of HiQ-31 boehmite, along with 376.84 g of MgO (both in powder form), are mixed separately. The MgO+HiQ-30 mixture is emptied into the iron solution (A) and the slurry obtained is dispersed for 4.5 hours (B). The final water/solids ratio was 12. The slurry is aged in a stainless steel reactor at 80° C. with a stirring speed of 250 rpm for 15 hours (C). The sample is dried at 100° C. for 12 hours (D). This material is designated MgFeAl. X-ray diffraction patterns taken at indicated aging times, pore size distribution and morphology of Example 6 are represented in FIGS. 18, 19 and 20, respectively.

Example 7

45.51 g of $Fe(NO_3)_3.9H_2O$ are dissolved in 1 L of bidistilled water. 19.01 g of HiQ-30 boehmite, along with 65.56 g of $Mg(OH)_2$ (both in powder form) are mixed separately. The $Mg(OH)_2$+HiQ-30 mixture is emptied into the iron solution and the slurry obtained is dispersed at 6000 rpm for 1 hour. The $M^{2+}/M^{3+}$ synthesis molar ratio is 2.5. The final water/solids ratio was 11. The slurry is aged in a glass reactor at 70° C. with a stirring speed of 250 rpm for 24 hours. The sample is dried at 100° C. for 12 hours. This material is designated MgOHFeAl. X-ray diffraction pattern, pore size distribution and morphology of Example 7 are represented in FIGS. 21, 22 and 23, respectively Example 8

The material from Example 5 is spray dried at 400° C. with a feed pressure of 120 psi. This material is designated MgAlFe. The spherical morphology of the particles obtained in Example 8 is shown in FIG. 25.

Given the numerous commercial applications at large scale, new alternatively simple and economically viable processes are required, particularly those in which products can be continuously obtained within environmental regulations. From the background described in the patents and scientific papers, it can concluded that the preparation process of MACs can be upgraded considering the following issues: (i) using more economical raw materials or reactants, (ii) designing processes where raw materials or reactants can be easily handled, (iii) eliminating unit operations involving products washing and/or purification steps. This later point particularly applied to MACs can be translated into energy and water-saving measures; in traditional co-precipitation methods a great amount of water is used to purify hydrotalcites since elimination of unreacted soluble anions, such as chloride and sulfates, among others, and unreacted alkaline soluble cations, such as: sodium or potassium must be extensive to avoid any related undesirable effects in some catalytic reactions. For example, the use of organic acids is described in some patents to peptize aluminas. However, the use organic acid is a costly additional step in the synthesis procedure. Besides, during drying and calcination steps of MACs obtained by conventional coprecipitation methods, sulfur oxides, nitrogen oxides and chlorine, etc. are produced, turning this procedures environmentally unfriendly.

While the present invention has been particularly shown and described with reference to exemplary embodiments thereof, it will be understood by those of ordinary skill in the art that various changes in form and details may be made therein without departing from the spirit and scope of the invention as defined by the following claims and equivalents thereof.

What is claimed is:

1. A multimetallic anionic clay (MAC) characterized in that the laminar metallic hydroxides have at least three different metal cations forming part of the anionic clay's layers and have the following formula:

$[M(II)_{1-x}M(III)_x(OH)_2](A^{n-}_{x/n}).mH_2O$, where [M(II)]/[(M(III)], is the molar ratio between the divalent cations and the trivalent cations and is 0.5-10; M(II) represents one or a combination of two or more different Group 2, 6-12 or 14 elements with a valence equal to two; M(III) represents a combination of two or more different elements selected from the group consisting of Group 4-9 or 13 elements, Ce, and La, with a valence equal to 3 and where each M(III) is different from M(II), A represents any anion located between the layers composed of the aforementioned cations, n– represents the interlaminar anion's negative electronic charge and may be from –1 to –8, m represents the water molecules present as hydration water or as water present in the interlaminar region and can be from 0-2, x=0.09 to 0.67.

2. The multimetallic anionic clay of claim 1, wherein said multimetallic anionic clay has an average bulk density of 0.1 to 5 g/cc.

3. The multimetallic anionic clay of claim 1, wherein said multimetallic clay exhibits an X-ray diffraction pattern characteristic of anionic clays and substantially no phases that are different from anionic clays.

4. The multimetallic clays of claim 1, having a specific surface area of 30 to 40 $m^2/g$, a total pore volume of 0.2 to 1.5 $cm^3/g$, and an average pore diameter of 2 to 100 nm.

5. The multimetallic anionic clay of claim 1, wherein said multimetallic anionic clays are obtained by a process comprising the steps of:

a) dissolving at least one water-soluble divalent and/or trivalent metal precursors in water, b) admixing at least one water-insoluble divalent and/or trivalent metal precursors in powder form or in water suspension form, or a combination of both, with solution (a) to form a reaction mixture, and dispersing the insoluble particles of said water-insoluble precursor in said reaction mixture, c) reacting the reaction mixture slurry at temperatures between 0-100° C., from 0.1 hour to 10 days, at atmospheric pressure or in an autoclave at temperatures between 100-300° C., at pressures greater than atmospheric pressure from 0.1 hour to 10 days, said slurry having a pH in the range of 6 to 12, and d) drying the slurry at a temperature between 60 and 250° C., with air, nitrogen, or a vacuum, or combination thereof.

6. The multimetallic anionic clay of claim 5, wherein the pH of the reaction mixture is adjusted to obtain a pure MAC structure by adding i) 0.1-10 molar acid solutions of $HNO_3$, HCl, acetic acid, formic acid, or any inorganic or organic acid that does not require washes in order to eliminate undesirable ions, or any combination thereof, or ii) 0.1-10 molar alkaline solutions of $(NH_4)_2CO_3$, $NH_4OH$, ammonium phosphate, urea, any alkaline compound that does not requires washes in order to eliminate undesirable ions, or any combination thereof.

7. The multimetallic anionic clay of claim 5, wherein the water soluble divalent metal precursor sources are compounds that contain a metal cation selected from the group consisting of $Ni^{2+}$, $Cu^{2+}$, $Ca^{2+}$, $Fe^{2+}$, $Co^{2+}$, $Sn^{2+}$, $Mn^{2+}$, $Cr^{2+}$, $Cd^{2+}$, $V^{2+}$, $Zn^{2+}$, $Mo^{2+}$, $Sr^{2+}$, $Ba^{2+}$, and mixtures thereof, and the divalent cation sources are selected from the group consisting of chlorides, sulfates, nitrates, acetates, and combinations thereof.

8. The multimetallic anionic clay of claim 5, wherein the water soluble trivalent metal precursor sources are compounds that contain a metal cation selected from the group consisting of $Fe^{3+}$, $Ga^{3+}$, $Co^{3+}$, $Mn^{3+}$, $Sc^{3+}$, $Cr^{3+}$, $B^{3+}$, $La^{3+}$, $Ce^{3+}$, and mixtures thereof, and the trivalent metal sources are selected from the group consisting of chlorides, sulfates, nitrates, acetates, and combinations thereof.

9. The multimetallic anionic clay of claim 5, wherein the water/solid weight ratio is between 0.1-1000.

10. The multimetallic anionic clay of claim 5, wherein the pH obtained by dissolution or suspension of the divalent and/or trivalent metal precursors is pH 1-7.

11. The multimetallic anionic clay of claim 5, wherein the water-insoluble divalent metal precursor is a compound containing a metallic cation selected from the group consisting of $Ni^{2+}$, $Cu^{2+}$, $Ca^{2+}$, $Fe^{2+}$, $Co^{2+}$, $Sn^{2+}$, $Mn^{2+}$, $Cr^{2+}$, $Cd^{2+}$, $V^{2+}$, $Zn^{2+}$, $Mo^{2+}$, $Sr^{2+}$, $Ba^{2+}$, and mixtures thereof, and the divalent cation sources are selected from the group consisting of hydroxides, oxides, carbonates, hydroxycarbonates, bicarbonates, acetates, oxalates, and mixtures thereof.

12. The multimetallic anionic clay of claim 5, wherein the water-insoluble divalent metal precursor is selected from the group consisting of MgO, $Mg(OH)_2$, hydromagnesite, magnesium hydroxyacetate, magnesium carbonate, magnesium bicarbonate, magnesium oxalate, dolomite, sepiolite, and combinations thereof.

13. The multimetallic anionic clay of claim 5, wherein the water-insoluble trivalent metal precursor source is a compound containing a metal cation selected from the group consisting of $Fe^{3+}$, $Ga^{3+}$, $Co^{3+}$, $Mn^{3+}$, $Sc^{3+}$, $Cr^{3+}$, $B^{3+}$, $La^{3+}$, $Ce^{3+}$, and mixtures thereof, and the trivalent metal source is selected from the group consisting of hydroxides, oxides, carbonates, hydroxycarbonates, bicarbonates, oxalates, and mixtures thereof.

14. The multimetallic anionic clay of claim 5, wherein the water-insoluble trivalent metal precursor is selected from the group consisting of boehmite and/or pseudoboehmite, gibbsite, bayerite, norstrandite, trihydrated alumina, BOC, and combinations thereof.

15. The multimetallic anionic clay of claim 5, wherein the water-soluble trivalent metal precursor is boehmite and/or pseudoboehmite having a crystal size of 10 to 100 Å, a particle size of 1 to 100 μm, and a dispersibility index in acid of 50 to 100%.

16. The multimetallic anionic clay of claim 5, wherein the reaction mixture in step (c) is without a pH adjustment in order to obtain the multimetallic anionic clay.

17. The multimetallic anionic clay of claim 5, wherein the insoluble components of the slurry are dispersed or homogenized in an aqueous medium before being added to the suspension or when they are already part thereof.

18. The multimetallic anionic clay of claim 5, wherein the stirring speed of the reaction mixture during the reaction is from 1-1000 rpm.

19. The multimetallic anionic clay of claim 5, wherein the reaction mixture is spray-dried in order to obtain microsphered multimetallic anionic clays.

20. The multimetallic anionic clay of claim 5, wherein said anionic clays are calcined between 400 and 1200° C., with an air, oxygen, nitrogen, or water vapor stream, or combinations thereof, for 1-24 hours.

21. The multimetallic anionic clay of claim 20, wherein the calcination products obtained are rehydrated in an aqueous medium between 50-100° C., for periods of 0.1-24 hours.

22. The multimetallic anionic clay of claim 20, wherein the calcination products are rehydrated and in which the aqueous medium contains additives and/or anions other than those originally contained in the multimetallic anionic clay precursor.

23. The multimetallic anionic clay of claim 20, wherein the calcined multimetallic anionic clays have a specific surface area of 30 to 400 $m^2/g$, a total pore volume of 0.2 to 1.5 $cm^3/g$, and an average pore diameter of 2 to 100 nm.

24. The multimetallic anionic clay of claim 1, wherein the reaction mixture is homogenized to produce small, uniform-sized particles of the water-insoluble components that are evenly dispersed.

25. The multimetallic anionic clay of claim 24, wherein said homogenizing is conducted with a high-speed stirrer at a speed of between 4000 and 10000 rpm, at temperatures between 0-100° C. from 0.1 to 12 hours.

26. The multimetallic anionic clay of claim 1, wherein said water-insoluble precursors are homogenized in water to produce small, uniform-sized particles of the water-insoluble components that are evenly dispersed prior to admixture with said water-soluble precursor.

27. The multimetallic anionic clay of claim 1, wherein the interlaminar anions are selected from the group consisting of carbonates, bicarbonates, carboxylates, hydroxyls, chlorides, bromides, nitrates, silicates, persulfates, dibasic phosphates, selenates, sulfides, sulfates, sulfites, tellurites, tetraboarates, thiosulfates, trisilicates, dichromates, molybdates, hexabromoplatinates, hexachloroiridates, hexacloropalladates, hexachloroplatinates, ferric bisulfates, tetrachloropalladates, tetrathiotungstates, tungstates, dichromates, metavanadates, dimolybdates, chromates, tetrachlorocuprates, tetracyanonickelates, stanates, arsenates, selenites, silicates, tellurates, heteropolyanions, phthalocyanines, ADN, and mixtures thereof.

* * * * *